# United States Patent
Wight et al.

(10) Patent No.: US 8,510,606 B2
(45) Date of Patent: Aug. 13, 2013

(54) METHOD AND APPARATUS FOR SAS SPEED ADJUSTMENT

(76) Inventors: Randolph Eric Wight, Boulder, CO (US); Ruiling Luo, Louisville, CO (US); Clive Scott Oldfield, Longmont, CO (US)

( * ) Notice: Subject to any disclaimer, the term of this patent is extended or adjusted under 35 U.S.C. 154(b) by 336 days.

(21) Appl. No.: 12/840,480

(22) Filed: Jul. 21, 2010

(65) Prior Publication Data
US 2011/0191637 A1 Aug. 4, 2011

Related U.S. Application Data

(60) Provisional application No. 61/301,440, filed on Feb. 4, 2010.

(51) Int. Cl.
*G06F 11/00* (2006.01)
(52) U.S. Cl.
USPC .................................. 714/43; 714/55; 714/56
(58) Field of Classification Search
USPC .................................................. 714/43, 55, 56
See application file for complete search history.

(56) References Cited

U.S. PATENT DOCUMENTS

| | | | |
|---|---|---|---|
| 5,491,687 A | 2/1996 | Christensen et al. | |
| 6,625,761 B1 * | 9/2003 | Sartore et al. | 714/43 |
| 6,671,831 B1 * | 12/2003 | Sartore et al. | 714/44 |
| 6,690,650 B1 * | 2/2004 | Stener | 370/241 |
| 6,738,834 B1 * | 5/2004 | Williams et al. | 710/8 |
| 6,973,602 B1 | 12/2005 | Fung et al. | |
| 7,543,190 B2 * | 6/2009 | Walker | 714/43 |
| 7,836,352 B2 * | 11/2010 | Sharma et al. | 714/44 |
| 8,032,809 B2 * | 10/2011 | Park et al. | 714/749 |
| 8,051,334 B2 * | 11/2011 | Jones et al. | 714/43 |
| 8,184,677 B1 * | 5/2012 | McRobert et al. | 375/213 |
| 2008/0005620 A1 * | 1/2008 | Walker | 714/43 |
| 2011/0103439 A1 * | 5/2011 | McKay et al. | 375/220 |
| 2011/0106997 A1 * | 5/2011 | Romero et al. | 710/300 |

OTHER PUBLICATIONS

Related U.S. Appl. No. 12/881,353 "Method and apparatus for SAS speed adjustment". U.S. Appl. No. 12/881,353 is a Continuation-in-Part of U.S. Appl. No. 12/840,480.
Information technology—Serial attached SCSI—2.1 (SAS-2.1), Working draft, American National Standard, Project T10/2125-D, Revision 02, May 19, 2009.
Information technology—SAS Protocol Layer (SPL), Working draft, American National Standard, Project T10/2124-D, Revision 02, May 19, 2009.
Official action for U.S. Appl. No. 12/881,353, mailed Jan. 14, 2013.

* cited by examiner

*Primary Examiner* — Joshua P Lottich

(57) ABSTRACT

A method for maintaining reliable communication between a command initiator and a target device is provided. After the command initiator detects an error corresponding to the target device and a path between the command initiator and the target device, the command initiator performs a downshift evaluation. The initiator maintains a transmission speed if the downshift evaluation determines that forgoing a transmission speed downshift is required, and reduces the transmission speed if the downshift evaluation determines that transmission speed downshift is required. The command initiator then logs the downshift evaluation result and reports any transmission speed change to a user.

18 Claims, 17 Drawing Sheets

Downshift evaluation: first embodiment

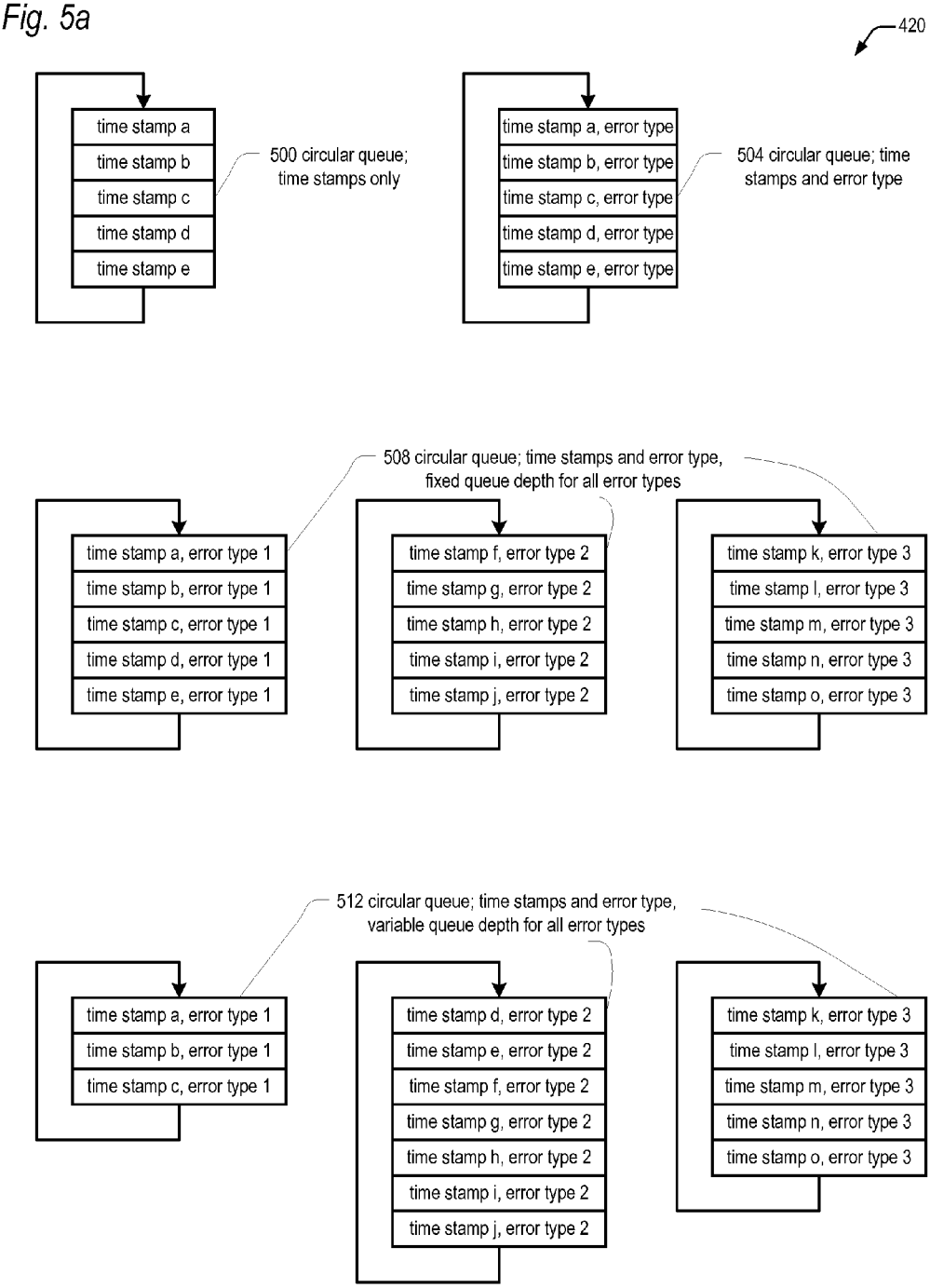

Fig. 5b    Sample error management for 8 paths
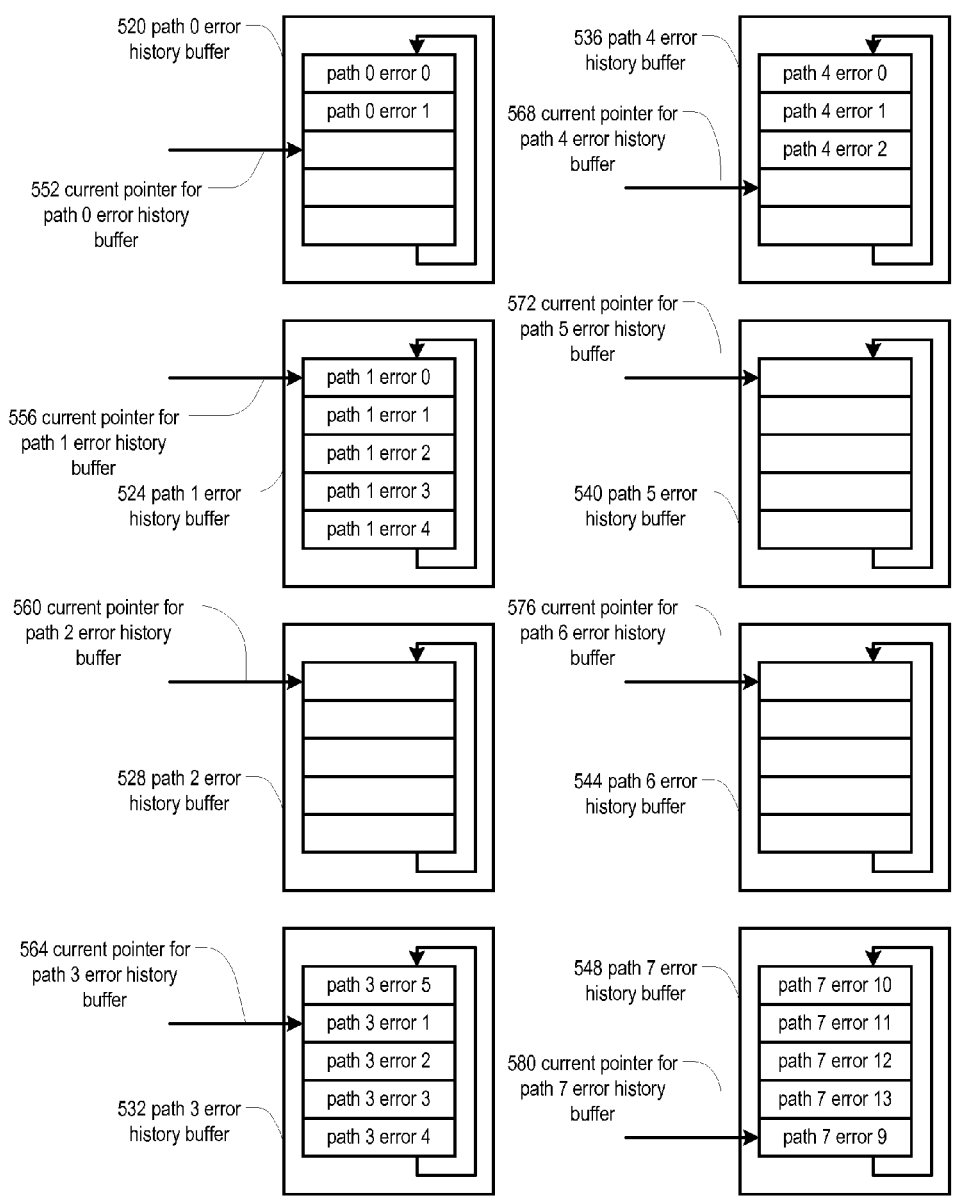

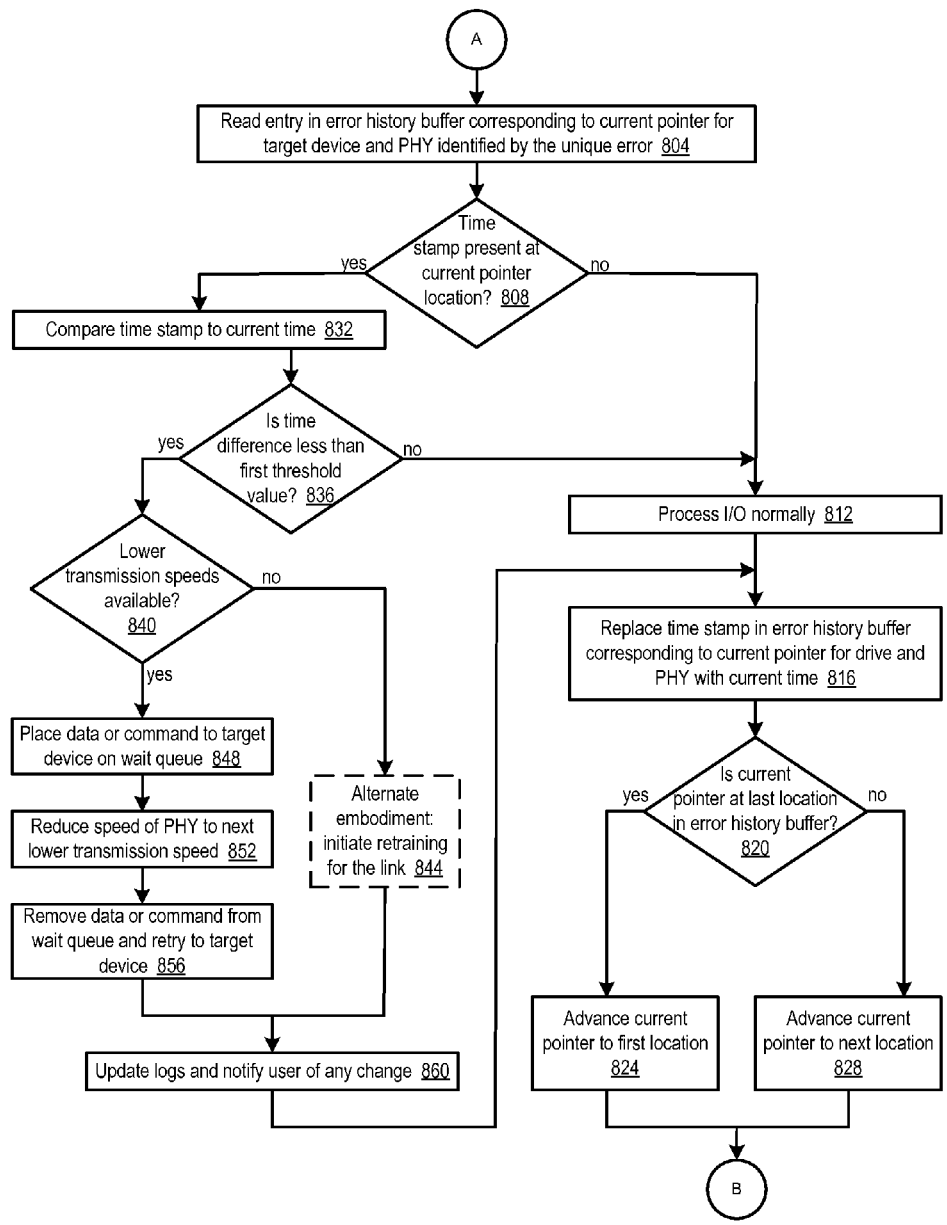
Fig. 8    Downshift evaluation: first embodiment

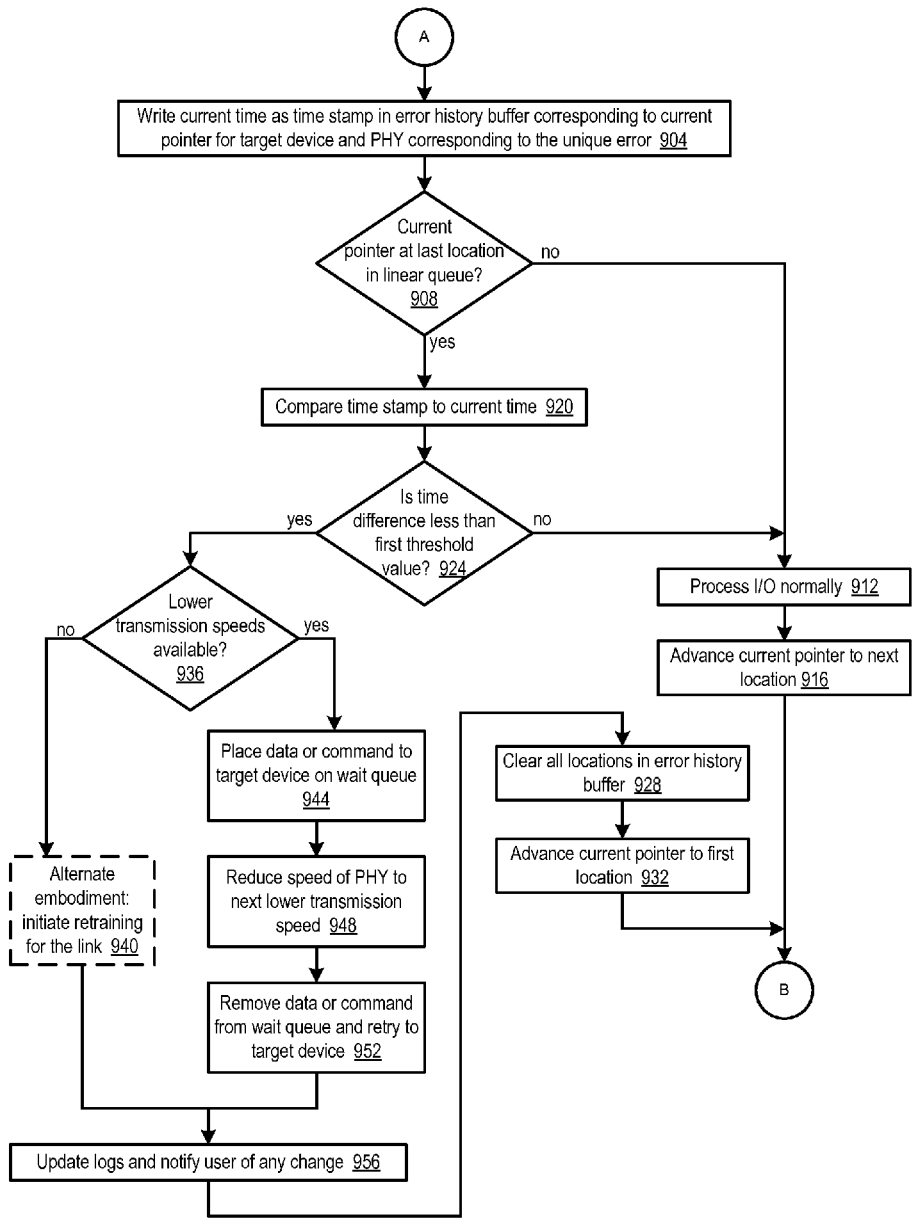
Fig. 9    Downshift evaluation: second embodiment

Fig. 10    Upshift evaluation: triggering events
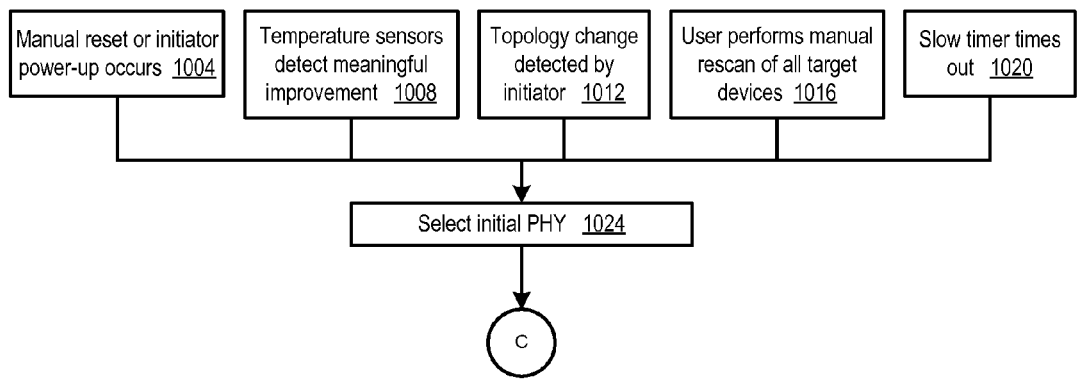

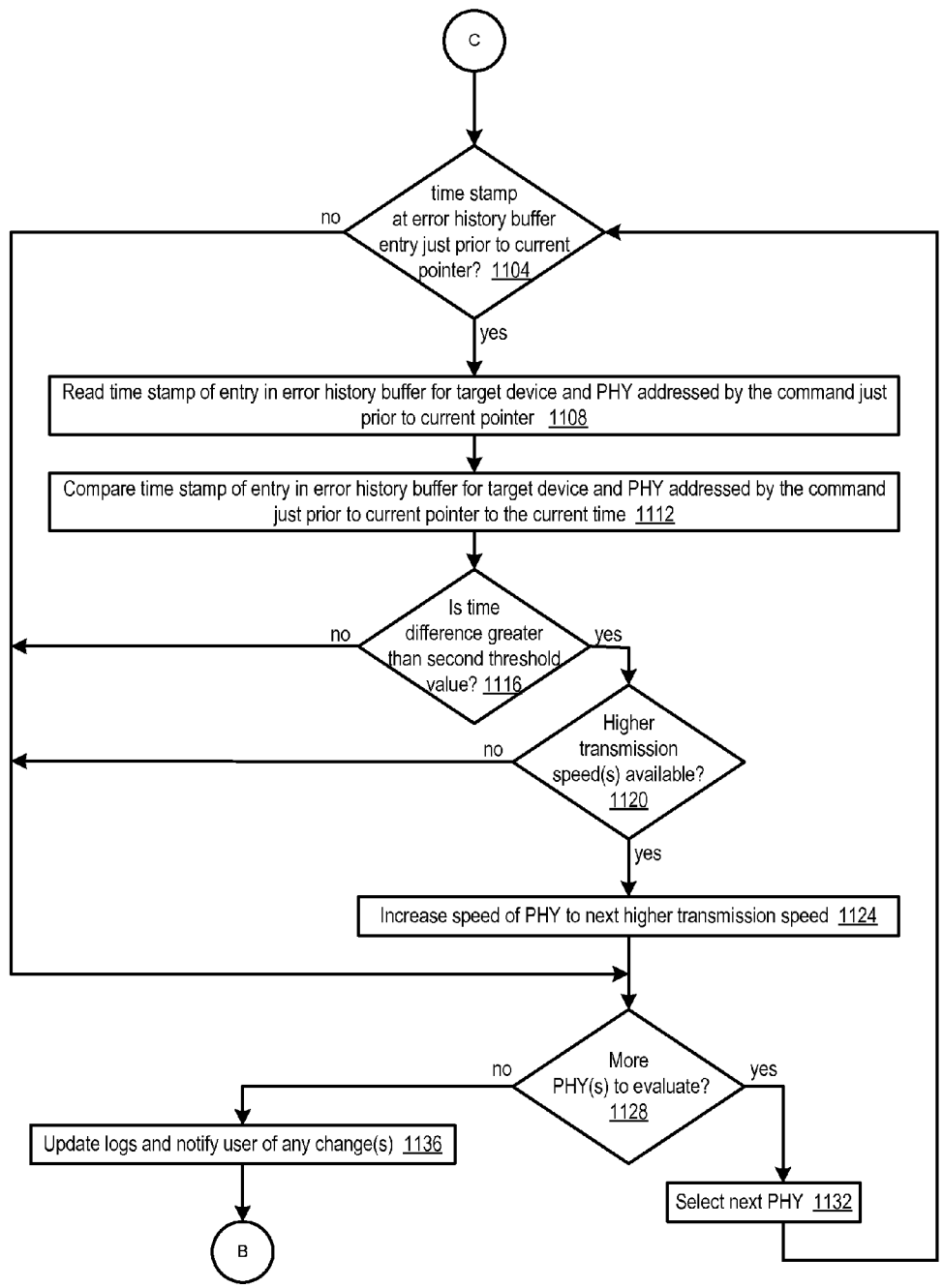
Fig. 11    Upshift evaluation: first embodiment

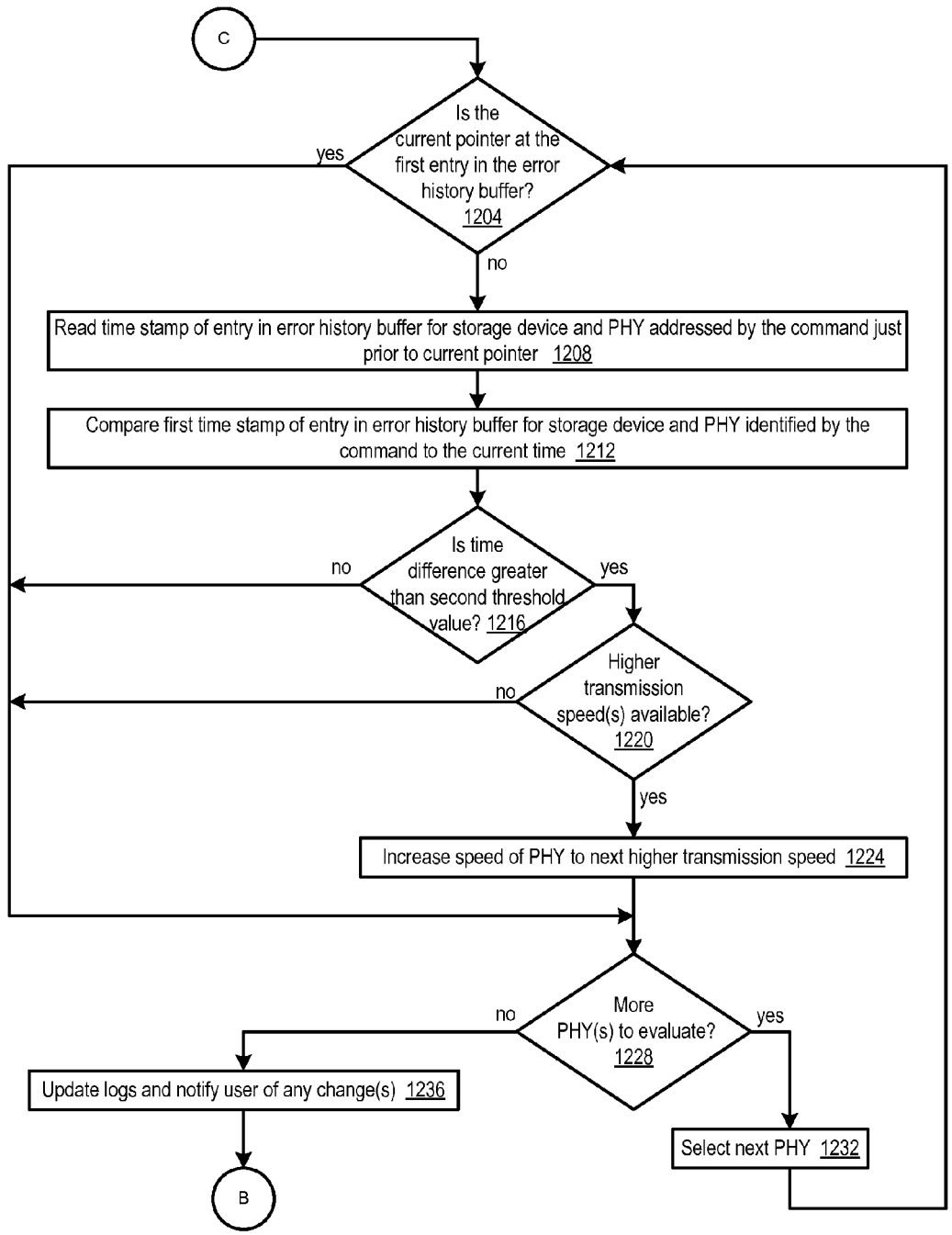
Fig. 12  Upshift evaluation: second embodiment

Fig. 13

| target device type 1308 | storage enclosure slot 1304 | | | | | | |
|---|---|---|---|---|---|---|---|
| | slot 0 | slot 1 | slot 2 | slot 3 | slot 4 | slot 5 | slot 6 |
| target device 0 | PHY parameters 0,0 | PHY parameters 0,1 | PHY parameters 0,2 | PHY parameters 0,3 | PHY parameters 0,4 | PHY parameters 0,5 | PHY parameters 0,6 |
| target device 1 | PHY parameters 1,0 | PHY parameters 1,1 | PHY parameters 1,2 | PHY parameters 1,3 | PHY parameters 1,4 | PHY parameters 1,5 | PHY parameters 1,6 |
| target device 2 | PHY parameters 2,0 | PHY parameters 2,1 | PHY parameters 2,2 | PHY parameters 2,3 | PHY parameters 2,4 | PHY parameters 2,5 | PHY parameters 2,6 |
| target device 3 | PHY parameters 3,0 | PHY parameters 3,1 | PHY parameters 3,2 | PHY parameters 3,3 | PHY parameters 3,4 | PHY parameters 3,5 | PHY parameters 3,6 |
| target device 4 | PHY parameters 4,0 | PHY parameters 4,1 | PHY parameters 4,2 | PHY parameters 4,3 | PHY parameters 4,4 | PHY parameters 4,5 | PHY parameters 4,6 |
| target device 5 | PHY parameters 5,0 | PHY parameters 5,1 | PHY parameters 5,2 | PHY parameters 5,3 | PHY parameters 5,4 | PHY parameters 5,5 | PHY parameters 5,6 |
| target device 6 | PHY parameters 6,0 | PHY parameters 6,1 | PHY parameters 6,2 | PHY parameters 6,3 | PHY parameters 6,4 | PHY parameters 6,5 | PHY parameters 6,6 |
| target device 7 | PHY parameters 7,0 | PHY parameters 7,1 | PHY parameters 7,2 | PHY parameters 7,3 | PHY parameters 7,4 | PHY parameters 7,5 | PHY parameters 7,6 |
| target device 8 | PHY parameters 8,0 | PHY parameters 8,1 | PHY parameters 8,2 | PHY parameters 8,3 | PHY parameters 8,4 | PHY parameters 8,5 | PHY parameters 8,6 |
| target device 9 | PHY parameters 9,0 | PHY parameters 9,1 | PHY parameters 9,2 | PHY parameters 9,3 | PHY parameters 9,4 | PHY parameters 9,5 | PHY parameters 9,6 |
| | slot 0 average PHY parameters | slot 1 average PHY parameters | slot 2 average PHY parameters | slot 3 average PHY parameters | slot 4 average PHY parameters | slot 5 average PHY parameters | slot 6 average PHY parameters |
| | average PHY parameters 1312 | | | | | | |

METHOD AND APPARATUS FOR SAS SPEED ADJUSTMENT

CROSS REFERENCE TO RELATED APPLICATION(S)

This application claims the benefit of U.S. Provisional Application Ser. No. 61/301,440 filed Feb. 4, 2010, entitled METHOD AND APPARATUS FOR SAS SPEED ADJUSTMENT, which is hereby incorporated by reference for all purposes and which were owned or subject to an obligation of assignment to Dot Hill Systems Corporation at the time the invention claimed herein was made.

FIELD

The present invention is directed to computer interfaces. In particular, the present invention is directed to methods and apparatuses for optimizing data transfer rates for reliable communications.

BACKGROUND

Serial-Attached-SCSI (SAS) systems are becoming more common in modern computing and data processing systems. SAS systems include SAS initiator devices and SAS target devices as does its parent, the Small Computer Systems Interface (SCSI). SAS target devices are typically storage devices, such as disk drives, that receive commands from SAS initiator devices, such as SAS host bus adapters in host computers or SAS I/O controllers in Redundant Arrays of Inexpensive Disks (RAID) controllers.

Implementations and uses of SAS are described in detail in the following documents, each of which is incorporated by reference in its entirety for all intents and purposes:

"Serial Attached SCSI—2.1 (SAS-2.1)", Revision 02, 19 May 2009. Working Draft, Project T10/2125-D, American National Standard Institute.

"Information technology—SAS Protocol Layer (SPL)", Revision 02, 19 May 2009. Working Draft, Project T10/2124-D, American National Standard Institute.

SAS systems are built on point-to-point serial connections between SAS devices. Each point-to-point connection is referred to as a link, and the two endpoints are individually referred to as a Physical Interface (PHY). A PHY contains a transmitter device (TX) and a receiver device (RX) and electrically interfaces to a link to communicate with another PHY at the other end of the link. The link includes two differential signal pairs; one pair in each direction. A SAS port includes one or more PHYs. A SAS port that has more than one PHY grouped together is referred to as a wide port, and the more than one link coupling the two wide ports are referred to as a wide link. Wide ports and wide links provide increased data transfer rates between SAS endpoints and enable multiple simultaneous connections to be open between a SAS initiator and multiple SAS targets.

The simplest SAS topology is a single SAS initiator having a SAS port that is connected by a single SAS link to a SAS port of a single SAS target. However, it is desirable in many applications, such as a high data availability RAID system, to enable one or more SAS initiators to communicate with multiple SAS target devices. In addition to initiators and targets, SAS includes a third type of device, expanders, which are employed in SAS systems to achieve more complex topologies. SAS expanders perform switch-like functions, such as routing, to enable SAS initiators and targets to communicate via the SAS point-to-point connections.

SUMMARY

The present invention is directed to solving disadvantages of the prior art. In accordance with embodiments of the present invention, a method for maintaining reliable communication between a command initiator and a target device is provided. In one embodiment, the target device detects a receive transmission error for a path between the target device and an expander coupled to the command initiator. The target device reports the receive transmission error to the command initiator. In a second embodiment, the transmitting protocol controller detects a transmission error. In a third embodiment, the transmitting protocol controller detects an I/O timeout from the target device.

The command initiator determines that the receive or protocol controller transmission error corresponds to marginal signal integrity for the path between the target device and the command initiator. In response to detecting an I/O timeout or determining that the receive transmission error corresponds to marginal signal integrity for the path between the target device and the command initiator, the command initiator performs a downshift evaluation for the path. In response to performing the downshift evaluation for the path, the command initiator maintains the transmission speed of the path if the downshift evaluation determines that forgoing a transmission speed downshift is required for the path and the command initiator reduces the transmission speed of the path if the downshift evaluation determines that a transmission speed downshift is required for the path. The command initiator logs the downshift evaluation result and reports any transmission speed change to a user.

In accordance with other embodiments of the present invention, a system for maintaining reliable communication between an expander and a target device is provided. The expander includes a transmit port, a receive port, a memory including a buffer and a processor. The system also includes a target device and a path, where the path is coupled to the expander and the target device. The path provides communication between the expander and the target device, and the target device may provide notification of a receive transmission error to the expander, a protocol controller detects a receive transmission error, or the protocol controller experiences an I/O timeout. For receive transmission errors, a command initiator determines that the receive transmission error corresponds to marginal signal integrity. The command initiator performs a downshift evaluation for the path, and in response to performing the downshift evaluation, the command initiator maintains the transmission speed of the path if the downshift evaluation determines that forgoing a transmission speed downshift is required for the path and the command initiator reduces the transmission speed of the path if the downshift evaluation determines that a transmission speed downshift is required for the path. The command initiator logs the downshift evaluation result and reports any transmission speed change to a user.

In accordance with still other embodiments of the present invention, a method for providing reliable point-to-point communications between an adjustable transmitter and a non-adjustable receiver is provided. The method includes transmitting first data from the transmitter to the receiver, where a path couples the transmitter to the receiver. The method includes detecting a signal integrity error or I/O timeout by the receiver, in response to the receiver receiving the first data from the transmitter. A first signal integrity error message is transmitted by the receiver to the transmitter, or a protocol controller detects a receive transmission error. In response to the transmitter receiving the first signal integrity message from the receiver, the protocol controller detecting a receive transmission error, or the protocol controller experiencing an I/O timeout, the transmitter performs a downshift evaluation. The transmitter determines if the downshift evaluation requires a downshift, and in response maintains path transmission speed if the downshift evaluation does not require a reduction in transmission speed. The transmitter reduces the path transmission speed to a next lower path transmission speed if the downshift evaluation requires a reduction in transmission speed, if a lower path transmission speed is available. The transmitter then logs the downshift evaluation result and reports any transmission speed change to a user. After a predetermined period of time has passed, the transmitter performs an up shift evaluation for all paths coupled to target devices. The transmitter determines if the up shift evaluation requires an increase in transmission speed, and in response the transmitter maintains path transmission speed if the up shift evaluation does not require an increase in transmission speed and the transmitter increases the path transmission speed to a next higher path transmission speed if the up shift evaluation requires an increase in transmission speed, if a higher path transmission speed is available. The transmitter then logs the up shift evaluation result(s) and reports any transmission speed change(s) to a user.

Advantages of the present invention include an automatic means to improve reliable communications between an expander and a target device. Another advantage is improving link throughput by automatically downshifting link transmission speed when a first error threshold is met or exceeded, and automatically up shifting link transmission speed when a second error threshold is met or exceeded, where the second error threshold is lower than the first error threshold. Another advantage of the present invention is a method for dynamically monitoring all links in a storage system to storage devices, and adjusting link transmission speeds in response to measured errors on each link.

Additional features and advantages of embodiments of the present invention will become more readily apparent from the following description, particularly when taken together with the accompanying drawings.

BRIEF DESCRIPTION OF THE DRAWINGS

FIG. 5a is a block diagram illustrating various error history buffer configurations of the present invention.

FIG. 5b is a block diagram illustrating an exemplary error management scenario employed for tracking path errors in accordance with embodiments of the present invention.

FIG. 8 is a flowchart illustrating steps of downshift evaluation in accordance with a first embodiment of the present invention.

FIG. 9 is a flowchart illustrating steps of downshift evaluation in accordance with a second embodiment of the present invention.

FIG. 10 is a flowchart illustrating steps of triggering events for upshift evaluation in accordance with the present invention.

FIG. 11 is a flowchart illustrating steps of upshift evaluation in accordance with a first embodiment of the present invention.

FIG. 12 is a flowchart illustrating steps of upshift evaluation in accordance with a second embodiment of the present invention.

FIG. 13 is a table illustrating storage of PHY parameters for a given combination of storage devices and target device slots in accordance with embodiments of the present invention.

DETAILED DESCRIPTION

Figure 1A:
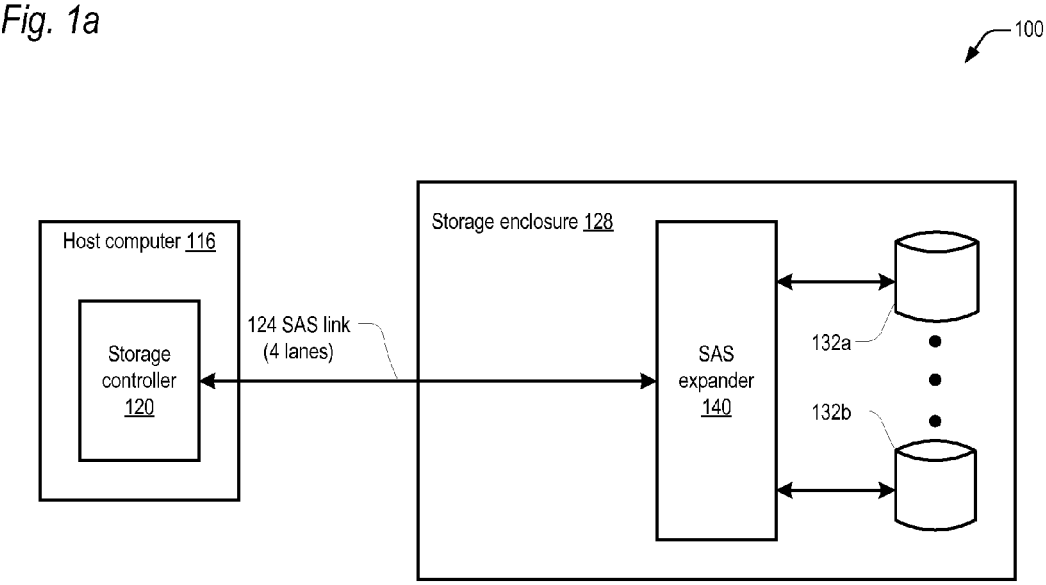
FIG. 1a is a block diagram illustrating components of a first electronic data storage system incorporating a data storage system in accordance with embodiments of the present invention.

The present inventors have observed various problems in complex topology systems having many paths between initiators and targets, where analog transmit parameters are controllable in the initiators, but not in the targets. Such systems include data storage systems having one or more storage controllers and many storage devices. Today, some problems have been observed with 6 Gigabit per second (Gb/s) SAS storage devices. Although Serial ATA (SATA) technology is currently limited to 3 GB/s transfer rates, it is expected that SATA will have 6 Gb/s devices available in the future. Additionally, SAS storage device roadmaps extend to 12 Gb/s and beyond. The present inventors observed higher transmission error rates at the faster transmission speeds, especially over the SAS link between an expander and a storage device. Transmission errors due to signal degradation often results in the need to resend commands multiple times, thereby causing delays and effectively reducing link bandwidth. In severe cases, a target device may stop responding altogether, resulting in inaccessible data. Such a loss may, for example, cause a Redundant Array of Inexpensive Disks (RAID) array to become critical even when no actual storage device failure has occurred, which then requires time-consuming and unnecessary data reconstruction. Integrated circuit manufacturers of target mode integrated circuits (ICs) incorporate front end logic differently according to generation 2 SAS specification requirements. For example, drive front end RX DFE (Receive Decision Feedback Equalization) parameters, EQ-gain logic parameters, and various hardware and software receive algorithms vary between device manufacturers and components.

One approach to dealing with transmission errors is simply to filter the number of errors received by an initiator, in order to reduce the likelihood of an error buffer in memory becoming full or overflowing. However, this approach does not improve system reliability or reduce the number of actual errors. Although the present invention is described with respect to SAS technology, it should be understood that the system and processes of the present invention apply to any such interface technology where multiple (2 or more) transmission speeds are supported.

Another approach for dealing with transmission errors is to empirically test every target device in every possible configuration (cable length, storage enclosure slot, type of initiator, etc), and either allow a user to input Physical Interface (PHY) parameters manually, or else allow a user to specify the cable type/length, enclosure slot position, and initiator type and from these entries select a set of PHY parameters that have been predetermined to operate reliably with the stated configuration. However, these approaches are prone to error in data entry and component identification. Additionally, this testing requires a significant amount of time-consuming testing for each such permutation—and increasing ongoing testing as new target devices, initiator types, connectors, cables, and midplanes are introduced.

SAS specifications provide for link training in order to establish a link. Link training is a short series of data transfers between each initiator and target to determine if basic communication is possible between a target and initiator, and is generally performed at power-up, after a detected topology change, or after manual reset of the initiator. Current solutions utilize a single set of PHY parameters for link training Typically, the link training PHY parameters are either an average of a known set of PHY parameters for various target devices, or the PHY parameters for a given target device. However, neither is ideal since optimal parameters for a given target device are usually different than average PHY parameters or the parameters for a specific device if the actual target is different. Although SAS link training establishes if basic communication is possible, it is not an ongoing activity or establishes that reliable communication is possible on a link. Link training may possibly establish that communication is possible at a given transmission speed, but communicating at the given transmission speed may produce a higher than desired transmission error rate. Therefore, what is needed is a means to achieve ongoing reliable link communications between a target and initiator, especially if transmission conditions change between the target and the initiator.

Referring now to FIG. 1a, a block diagram illustrating components of a first electronic data storage system 100 incorporating a data storage system 128 in accordance with embodiments of the present invention is shown. The electronic data storage system 100 includes one or more host computers 116. Host computer 116 is generally a server, but could also be a desktop or mobile computer. Host computer 116 executes application programs that generate read and write requests to storage devices 132. Host computer 116 includes one or more storage controllers 120, although only a single storage controller 120 is illustrated for clarity. In one embodiment, storage controller 120 is a host bus adapter. In another embodiment, storage controller 120 is a RAID controller. Storage controller 120 may either be integrated on the motherboard of host computer 116, or may be an add-in board or assembly in host computer 116. In one embodiment, host computer 116 executes the steps of the present invention illustrated in FIGS. 8-12.

Figure 3:
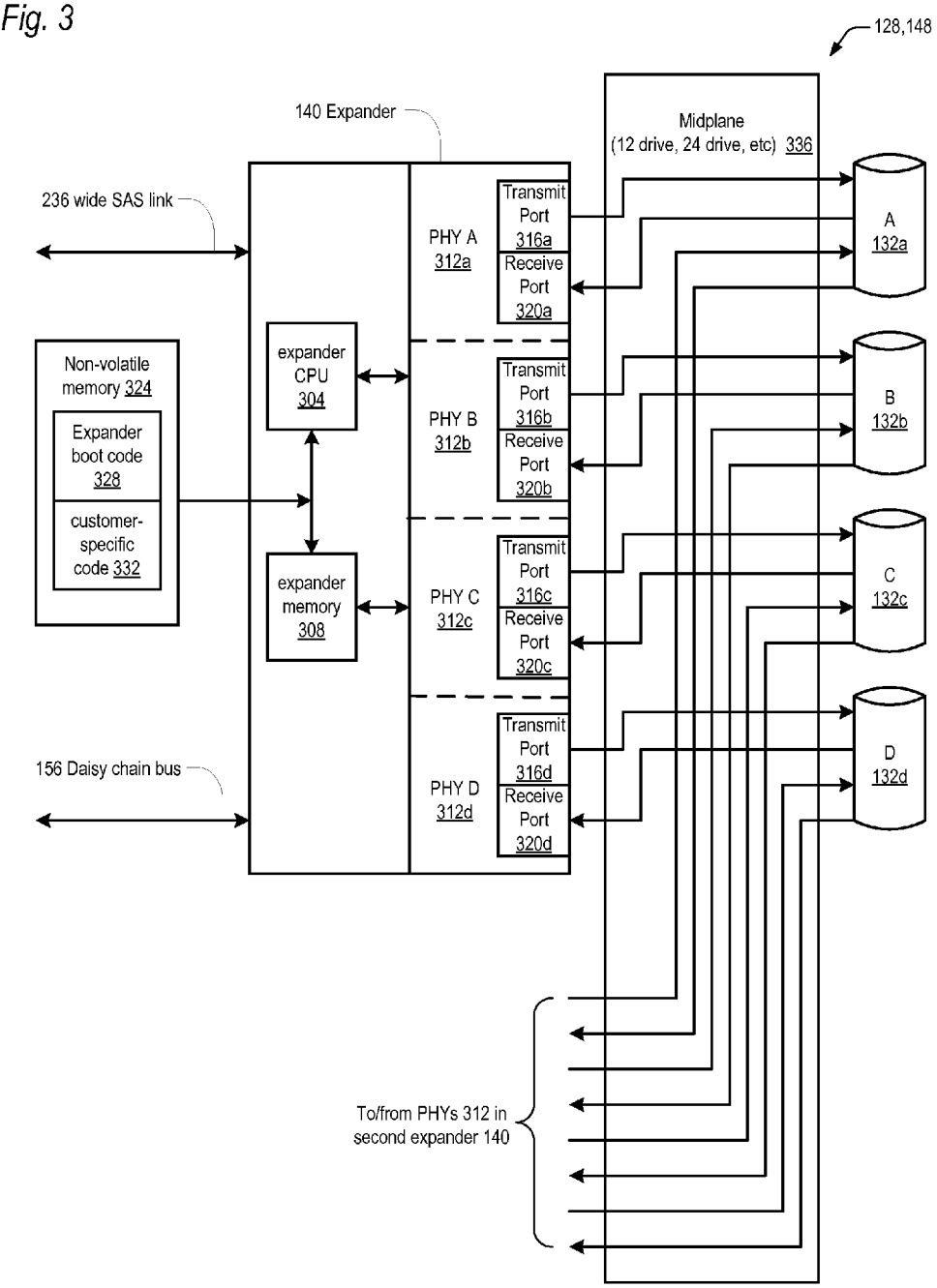
FIG. 3 is a block diagram illustrating components of a storage enclosure in accordance with embodiments of the present invention.

Storage controller 120 transfers data to and from storage devices 132a, 132b in storage enclosure 128, over SAS link 124. In one embodiment, SAS link 124 is a wide SAS link, comprising 4 SAS lanes. Storage enclosure 128 includes one or more SAS expanders 140, which performs switching functions, and transfers data and commands between SAS link 124 and storage devices 132a, 132b. In general, the transmit and receive paths to storage devices 132 are single lane SAS connections. However, in the future it is possible each transmit or receive path could be a multiple lane SAS link. Each link between SAS expander 140 and storage devices 132 includes separate transmit and receive paths, and each storage device 132 generally has two ports for independent interconnection to different SAS expanders 140 as illustrated in FIG. 3. Storage devices 132 are storage peripheral devices including, but not limited to hard disk drives, solid state drives, tape drives, and optical drives.

Figure 1B:
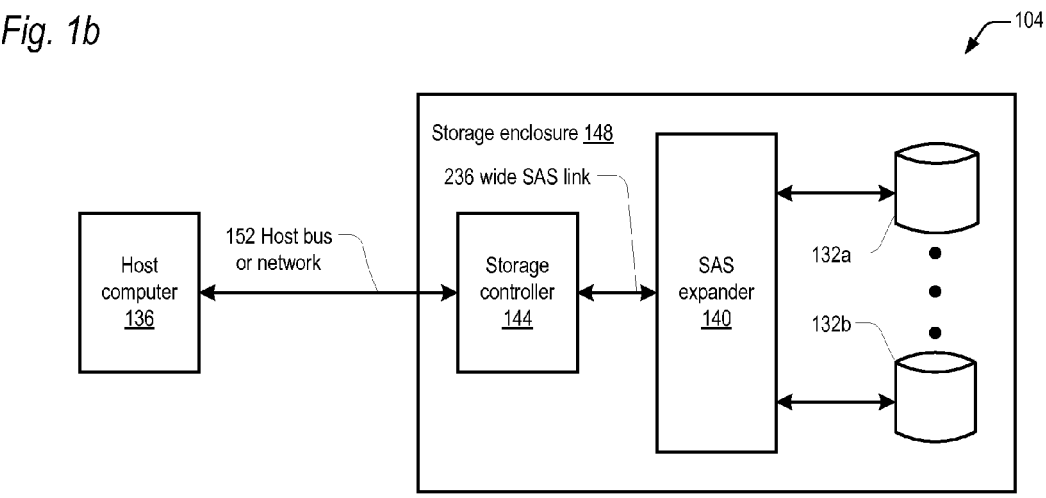
FIG. 1b is a block diagram illustrating components of a second electronic data storage system incorporating a data storage system in accordance with embodiments of the present invention.

Referring now to FIG. 1b, a block diagram illustrating components of a second electronic data storage system 104 incorporating a data storage system 148 in accordance with embodiments of the present invention is shown. Host computer 136 performs most of the functions previously described with respect to host computer 116, although the steps of FIGS. 8-12 are instead performed by storage controller 144. Storage enclosure 148 is similar to storage enclosure 128, except that one or more storage controllers 144 are present. Storage controller 144 is described in more detail with respect to FIG. 2. Host computer 136 communicates with storage enclosure 148 including storage controller 144 over host bus or network 152. Host bus or network 152 is any suitable bus or network that allows high speed data transfer between host computer 136 and storage controller 144. Examples of host bus or network 152 include, but are not limited to, SCSI, Fibre Channel, SSA, SCSI, SAS, iSCSI, Ethernet, Infiniband, ESCON, ATM, and FICON. In some embodiments, host bus or network 152 is a storage area network (SAN).

Figure 1C:
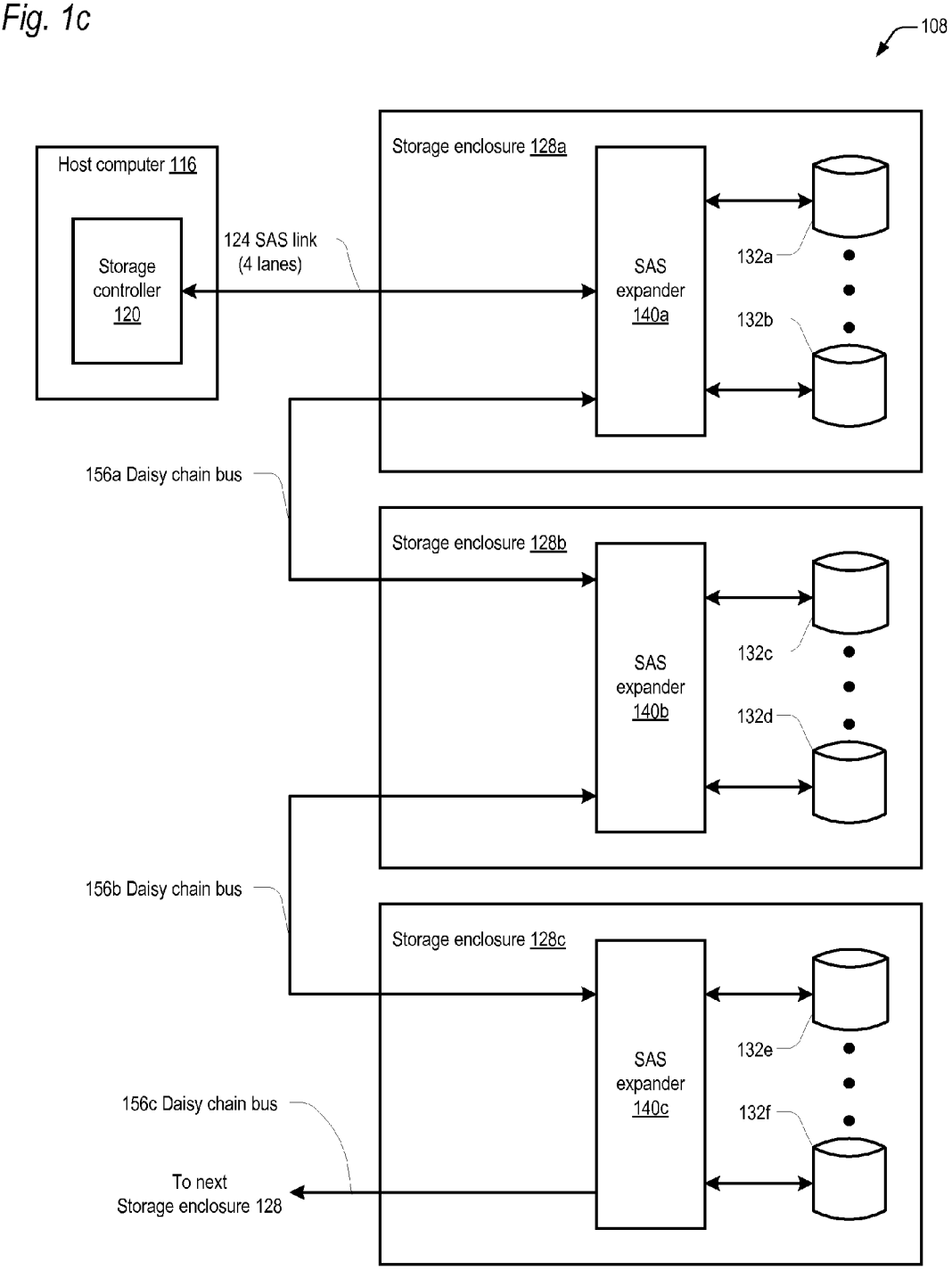
FIG. 1c is a block diagram illustrating components of a third electronic data storage system incorporating one or more data storage systems in accordance with embodiments of the present invention.

Referring now to FIG. 1c, a block diagram illustrating components of a third electronic data storage system 108 incorporating data storage systems 128 in accordance with embodiments of the present invention is shown. Electronic data storage system 108 is similar to electronic data storage system 100 of FIG. 1a, but additional storage enclosures 128b, 128c are provided to support additional storage devices 132c, 132d, 132e, and 132f. In order to support additional storage enclosures 128b, 128c, SAS expanders 140 utilize daisy chain buses 156. Daisy chain bus 156 utilizes the same protocol as SAS link 124, and is generally a SAS wide bus. Daisy chain bus 156a interconnects SAS expander 140a and SAS expander 140b. Daisy chain bus 156b interconnects SAS expander 140b and SAS expander 140c. Daisy chain bus 156c interconnects SAS expander 140c and another storage enclosure 128, in a similar fashion to Daisy chain buses 156a and 156b. In one embodiment, each storage enclosure 128 supports twelve storage devices 132 and each storage controller 120 supports up to 128 storage devices 132. However, in other embodiments each storage enclosure 128 may support more or fewer than 12 storage devices 132, and each storage controller 120 may support more or fewer than 128 storage devices 132.

Figure 1D:
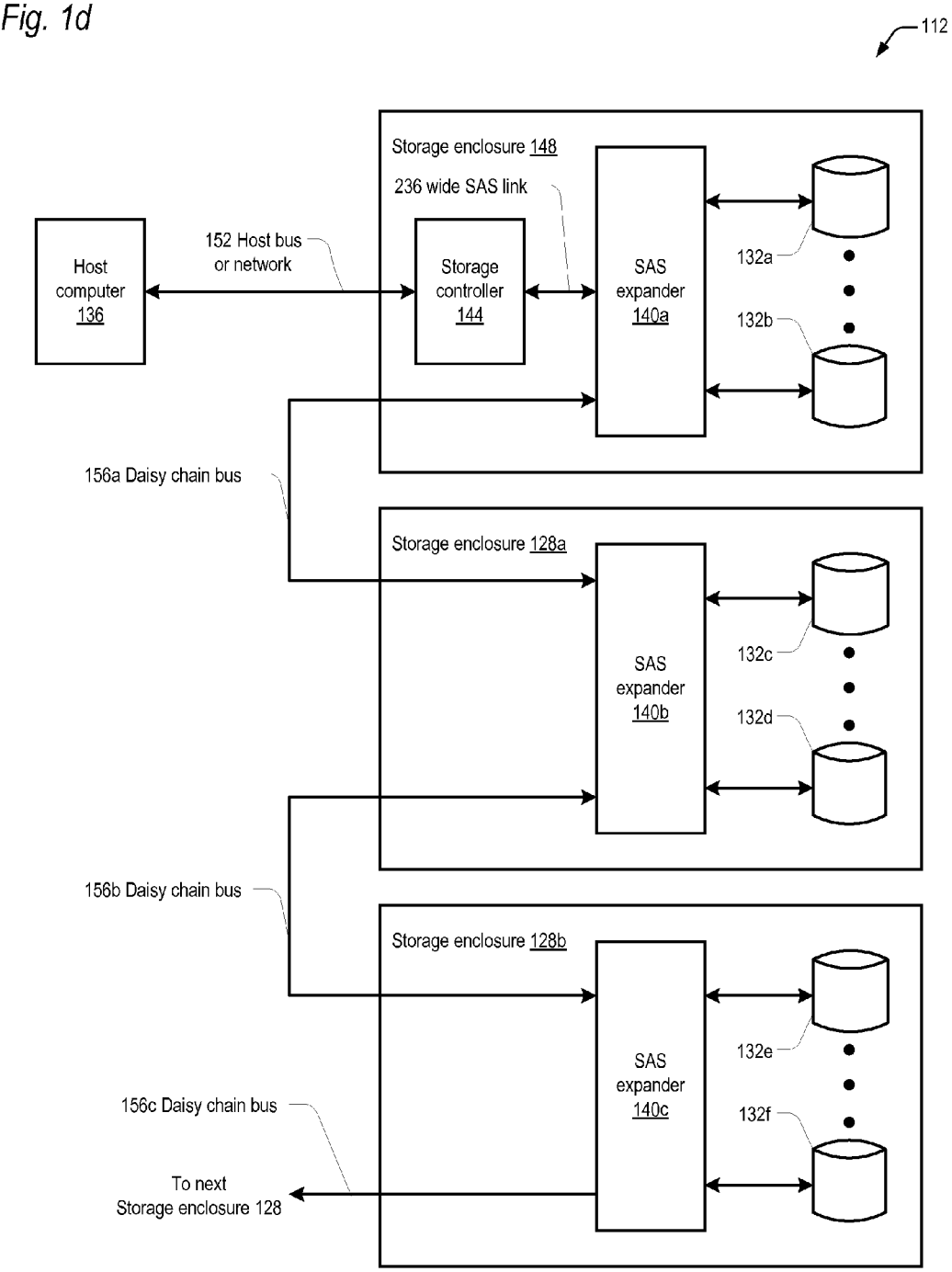
FIG. 1d is a block diagram illustrating components of a fourth electronic data storage system incorporating one or more data storage systems in accordance with embodiments of the present invention.

Referring now to FIG. 1d, a block diagram illustrating components of a fourth electronic data storage system 112 incorporating a data storage system 148 and multiple data storage systems 128 in accordance with embodiments of the present invention is shown. Electronic data storage system 112 is similar to electronic data storage system 104 of FIG. 1b, but additional storage enclosures 128b, 128c are provided to support additional storage devices 132c, 132d, 132e, and 132f. In order to support additional storage enclosures 128a, 128b, SAS expanders 140 utilize daisy chain buses 156. Daisy chain bus 156 utilizes the same protocol as SAS link 124, and is generally a SAS wide bus. Daisy chain bus 156a interconnects SAS expander 140a and SAS expander 140b. Daisy chain bus 156b interconnects SAS expander 140b and SAS expander 140c. Daisy chain bus 156c interconnects SAS expander 140c and another storage enclosure 128, in a similar fashion to Daisy chain buses 156a and 156b. In one embodiment, each storage enclosure 128 supports twelve storage devices 132 and each storage controller 144 supports up to 128 storage devices 132. However, in other embodiments each storage enclosure 128 may support more or fewer than 12 storage devices 132, and each storage controller 144 may support more or fewer than 128 storage devices 132.

Figure 2:
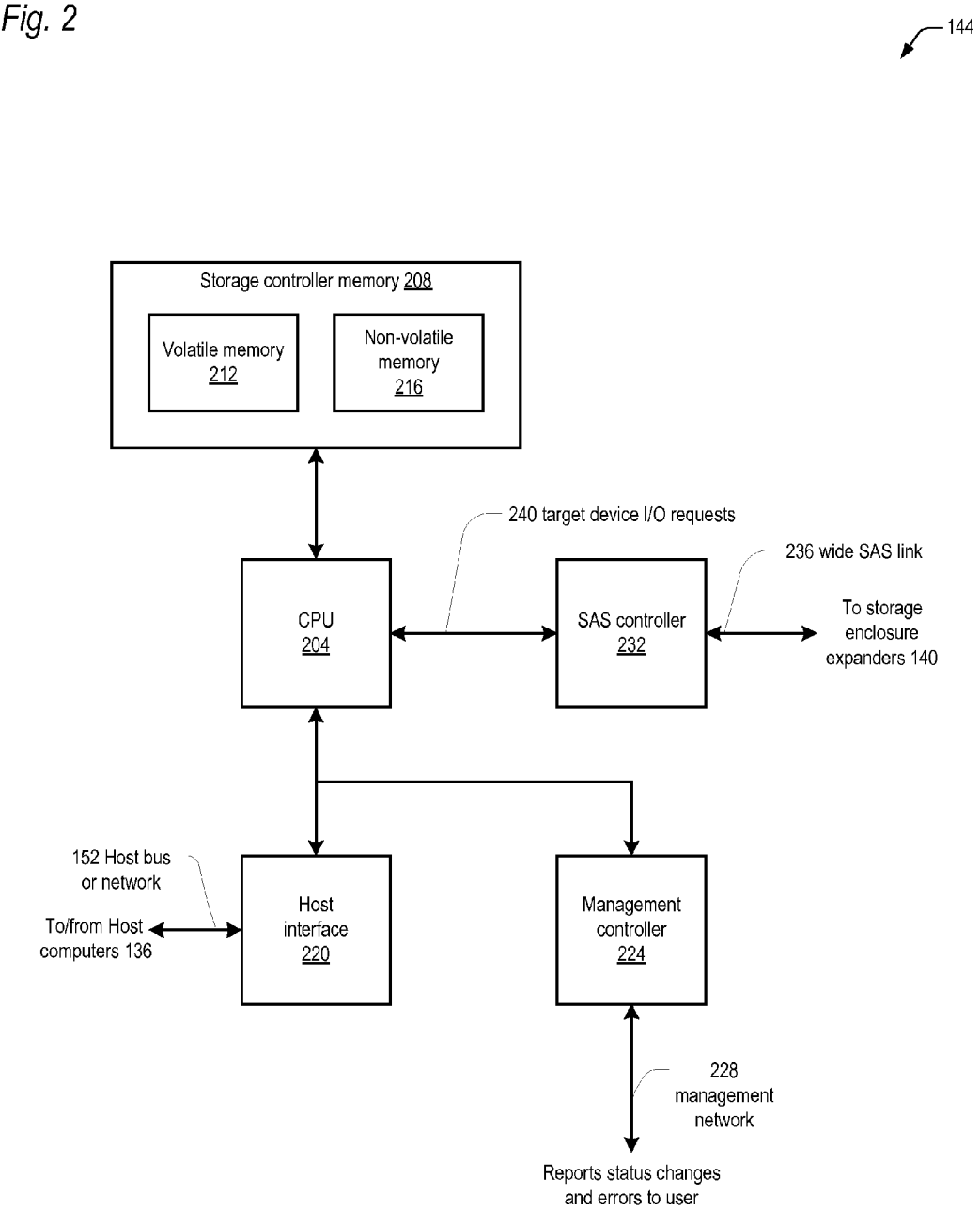
FIG. 2 is a block diagram illustrating components of a storage controller in accordance with embodiments of the present invention.

Referring now to FIG. 2, a block diagram illustrating components of a storage controller 144 in accordance with embodiments of the present invention is shown. Storage controller 144 includes a CPU 204, which executes stored programs that manage data transfers between host computers 136 and storage devices 132. CPU 204 includes any processing device suitable for executing storage controller 144 programs, such as Intel x86-compatible processors, embedded processors, mobile processors, and/or RISC processors. CPU 204 may include several devices including memory controllers, North Bridge devices, an/or South Bridge devices. Host computers 136 generate read and write I/O requests over host bus or network 152 to host Interface 220. Multiple host computers 136 may interact with storage controller 144 over host bus or network 152.

CPU 204 is coupled to storage controller memory 208. Storage controller memory 208 includes both non-volatile memory 216 and volatile memory 212. The non-volatile memory 216 stores the program instructions that CPU 204 fetches and executes, including program instructions for the processes of FIGS. 8-12. Examples of non-volatile memory 216 include, but are not limited to, flash memory, SD, EPROM, EEPROM, hard disks, and NOVRAM. Volatile memory 212 stores various data structures including the error history buffers of FIGS. 4-6. Examples of volatile memory 212 include, but are not limited to, DDR RAM, DDR2 RAM, DDR3 RAM, and other forms of temporary memory that do not retain data contents across power cycles.

Storage controller 144 may have one host interface 220, or multiple host interfaces 220. Storage controller 144 has one or more SAS protocol controller devices 232, which pass SAS signals over wide SAS link 236 to one or more SAS expanders 140. CPU 204 generates target device I/O requests 240 to SAS controller 232. In one embodiment, the SAS controller 232 is an LSI 2008 6 Gigabit per second (Gb/s) device and the expander 140 is a 36-port PMC device. The electronic data storage system 108, 112 may include multiple SAS paths 240, 156 and multiple storage enclosures 128, 148.

Storage enclosure 128, 148 include a number of target devices 132. In one embodiment, storage enclosures 128, 148 include up to twelve (12) SAS storage devices 132. In another embodiment, storage enclosures 128, 148 include twenty-four (24) SAS storage devices 132. However, the number of target devices 132 may be less or more than twelve or twenty four. Multiple storage enclosures 128, 148 may be daisy chained with daisy chain bus 156a, 156b, 156c in order to increase the number of target devices 132 controlled by storage controller 120, 144.

Expanders 140a, 140b, and 140c transfer data and commands to target devices 132. In general, the transmit and receive paths to target devices 132 are single lane SAS connections. However, in the future it is possible each transmit or receive path could be a multiple lane SAS connection, or some other form of connection.

Each storage controller 144 also includes a Management controller 224. CPU 204 reports status changes and errors to the Management controller 224, which communicates status changes for storage controller 144 and errors to one or more users or administrators over management network 228. Management network 228 is any bus or network capable of transmitting and receiving data from a remote computer, and includes Ethernet, RS-232, Fibre Channel, ATM, SAS, SCSI, Infiniband, or any other communication medium. Such a communication medium may be either cabled or wireless. In some storage controllers 144, status changes and errors are reported to a user or administrator through host interface 220 over host bus or network 152.

As can be seen in FIG. 1c or 1d, there may be many links between endpoints. For example, in FIG. 1d, storage controller 144 may transmit an I/O request to storage device 132e. This requires a transfer from SAS controller 232 through expander 140a over a wide SAS link 240, across daisy chain bus 156a, SAS expander 140b, daisy chain bus 156b, SAS expander 140c to disk 132e in storage enclosure 128b.

Referring now to FIG. 3, a block diagram illustrating components of a storage enclosure 128, 148 in accordance with embodiments of the present invention is shown. In the case of a storage enclosure 148, storage controller(s) 144 are not illustrated in FIG. 3 for simplicity. However, it should be understood that storage controller(s) 144 interconnect to expander 140 through wide SAS link 236, as shown in FIGS. 1b and 1d. The present invention deals with improving data transfer reliability on links between expanders 140 and target devices 132. A system utilizes the present invention on all such SAS links, resulting in system-level link reliability improvements. Although a SAS controller 232 is the initiator for any I/O request addressed to a specific target device 132, the SAS signals pass through at least one expander 140. However, only the PHYs 312 in the last expander 140 before the target devices 132 (i.e. the expander 140 directly connected to the target devices 132) are monitored and adjusted according to the present invention.

The storage enclosure 128, 148 of FIG. 3 includes a plurality of target devices 132 interconnected to one or more expanders 140 through a midplane 336, which may be designed to support a given number of target devices 132. SAS controller 232 is the initiator, and target devices 132 are target devices. In one embodiment, the midplane 336 supports 12 target devices 132. In another embodiment, the midplane 336 supports 24 target devices 132. The target devices 132 are typically individually hot-pluggable to aid in quick field replacement, in conjunction with RAID or redundant storage arrangements. For simplicity, only four target devices 132a-132d are shown, with each target device 132 having a separate transmit and receive path to the midplane 336. Target devices 132 are dual-ported, with two sets of transmit and receive paths to expander PHYs 312. However, only one transmit and receive path is shown interconnected to expander PHYs 312 for each target device 132 for simplicity.

Expander 140 includes an expander CPU 304 and expander memory 308, and multiple physical interfaces or PHYs 312a-312d. Each PHY 312 has a transmit port 316 and a receive port 320. Each PHY 312 is therefore coupled to a different port of a target device 132 through the midplane 336. For example, transmit port 316c and receive port 320c of PHY 312c are coupled to target device 132c. Connections to target devices 132 typically have only a single SAS lane per port, with dual ports as stated previously and illustrated in FIG. 3.

Storage enclosure 128, 148 has a non-volatile memory 324 coupled to expander 140. Examples of non-volatile memory 324 include, but are not limited to, flash memory, SD, compact flash, EPROM, EEPROM, and NOVRAM. The non-volatile memory 324 stores program instructions that are executed by the expander CPU 304 of expander 140. The program instructions are organized as expander boot code 328 and customer-specific code 332. The expander boot code 328 generally consists of program instructions to internally configure the expander 140 and boot-time diagnostics to make sure the expander 140 is internally operational. The customer-specific boot code 332 generally consists of program instructions that initially configure PHY 312 parameters and perform the expander portion of the process steps of FIG. 7 (blocks 704-716). The expander 140 functions after power-on by reading expander boot code 328 and customer-specific code 332 into expander memory 308. Once both sets of code are stored in expander memory 308, expander CPU 304 first executes the expander boot code 328 followed by the customer-specific code 332. The process of FIGS. 8-12 is executed by CPU 204 of storage controller 144 or the CPU of either host computer 116 or storage controller 120.

Target devices 132 report receive errors to Expander 140. Expander 140 reports errors to SAS controller 232, which then reports the errors to CPU 204. CPU 204 transmits errors to Management controller 224, which then reports errors to a user or system administrator over management network 228. SAS controller 232 may alternatively detect receive transmission errors or target device timeouts, and report such errors to CPU 204 and Management controller 224.

Each of these individual links between a PHY port 316, 320 and a target device 132 has different routing through semiconductor devices, cables, connectors, PCB traces and so on. Therefore, path lengths and electrical characteristics will vary between links. In addition to path length variations, other factors affect electrical performance of links. Manufacturing differences between components, connector fit variances, PCB trace impedance, and inconsistent PCB routing contribute to electrical differences between paths. When a component is marginal or goes bad, such as a SAS device that generates logical errors, it may be caused by improper PHY analog settings, a bad or marginal PHY, or a bad or marginal link, which may include bad or marginal cables, connectors, or printed circuit board assembly traces. Some of the manifestations of the faulty components include intermittent communication errors between SAS devices, spurious transmit errors, or complete loss of a SAS link. Another manifestation is the inability for a SAS initiator to see a SAS target in the topology due to intermittent failures that cause a SAS device to work sufficiently well to be allowed into the topology, but to be sufficiently faulty to prevent effective communication between SAS devices. These problems are exacerbated at higher SAS transfer speeds. For example, today SAS devices support transfer rates of 1.5, 3, or 6 Gb/s. Soon, devices will be available that can support up to 12 Gb/s transfer rates. Transfer rates well beyond 12 Gb/s are expected to be achievable in the future.

One method of dealing with errors due to signal integrity problems between expanders 140 and target devices 132 is to attempt to identify the faulty component and send a command through either the SAS domain or other bus such as an Inter-Integrated Circuit ($I^2C$) or Universal Asynchronous Receiver/Transmitter (UART) bus to disable, or bypass, various PHYs 312 in the domain in a trial-and-error approach until the initiator has isolated the problem. However, some failure scenarios cannot be satisfactorily remedied by this approach. For example, assume a component fails in an intermittent fashion, such as a marginal PHY 312, that causes an expander 140 to first detect that a SAS link is operating properly, to subsequently detect that the link is not operating properly, and to continue this sequence for a relatively long time. According to the SAS standard, the expander 140 is required to transmit a BROADCAST primitive on each of its SAS ports to notify other SAS devices of the change of status within the SAS domain. Each time a SAS initiator receives the BROADCAST primitive it is required to perform a SAS discover process to discover the device type, SAS address, and supported protocols of each SAS device in the SAS domain and to configure routing tables within the expanders 140 as needed. The SAS discover process can take a relatively large amount of time to complete. If an expander 140 transmits BROADCAST primitives due to the operational to non-operational link transitions according to a period that is comparable to the SAS discover process time, then consequently the SAS initiator may be unable to effectively send commands though the SAS domain to identify and remedy the problem. Even if the initiator is successful in identifying and fixing the problem, the SAS domain may have been effectively unavailable for providing user data transfers for an unacceptable length of time.

Another potential problem in SAS systems is the fact that the SAS standard allows cables that connect SAS PHYs 312 to be anywhere within a relatively large range of lengths. For example, the SAS specification allows for cable lengths up to eight meters. The length of the SAS cable may significantly impact the quality of the signals received on the SAS link between two SAS PHYs 312. What is needed is a solution to improve the data availability in SAS systems, which are subject to the foregoing problems.

Figure 4:
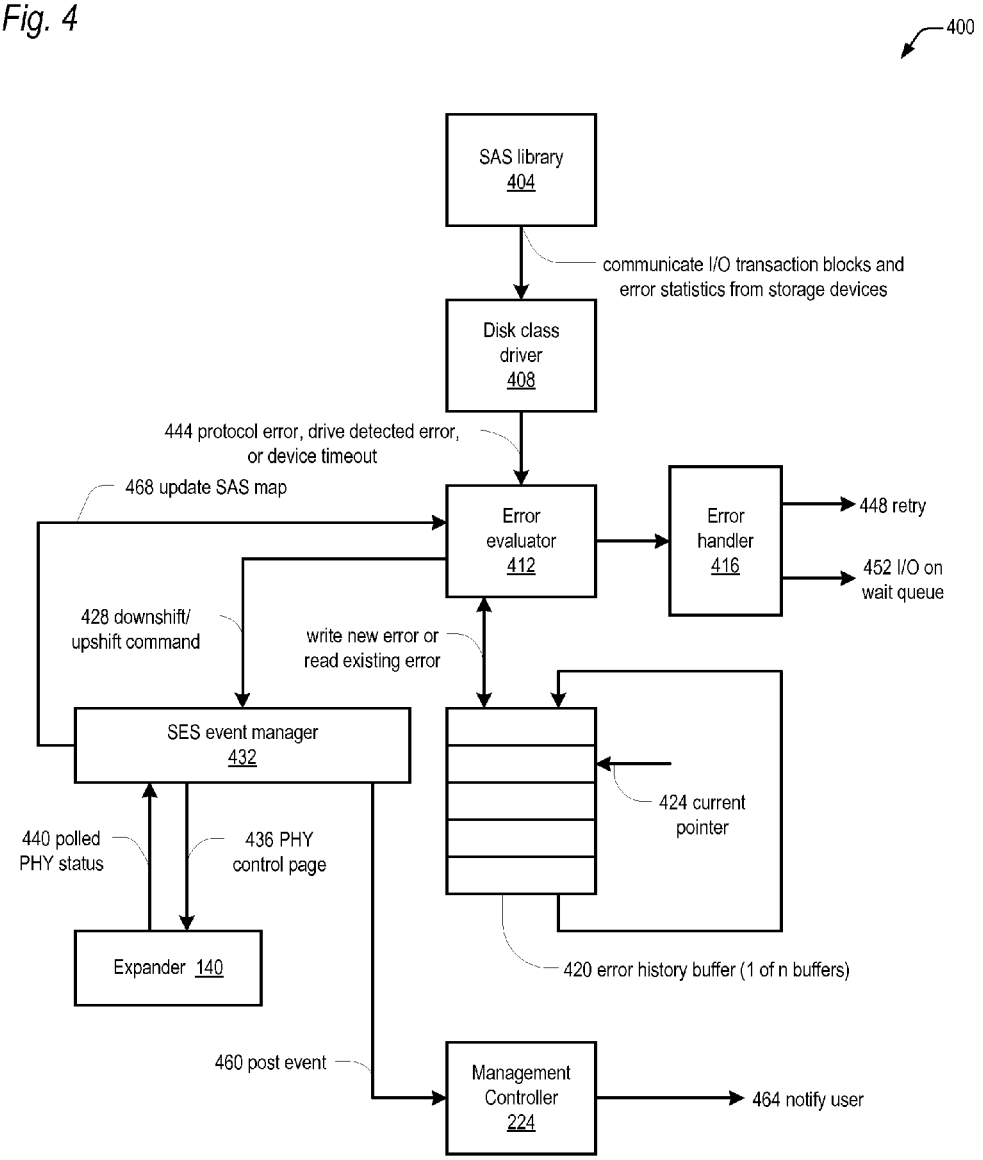
FIG. 4 is a block diagram illustrating software components of a SAS initiator in accordance with embodiments of the present invention.

Referring now to FIG. 4, a block diagram illustrating software components of a SAS initiator 400 in accordance with embodiments of the present invention is shown. The SAS initiator 400 includes a SAS library 404, which includes I/O transaction blocks for all I/Os directed to each target device 132 managed by the SAS initiator 400. I/O transaction blocks include information identifying the success status for each I/O and error statistics for each target device 132. The SAS library 404 passes the I/O transaction blocks to a disk class driver 408, which makes decisions based on errors in the I/O transaction blocks.

The disk class driver 408 extracts certain errors that can potentially cause a link speed downshift from the I/O transaction blocks, and sends those errors to an error evaluator 412. In a preferred embodiment, the errors that can potentially cause a downshift are 444 SAS protocol errors, drive detected errors, and target device timeouts. In other embodiments, other types of errors may cause a downshift 444. If the error is one of the three types that can cause a downshift 444, then the error evaluator 412 reads the current entry from an error history buffer 420.

The current entry in the error history buffer 420 is identified by a current pointer 424. The SAS initiator 400 includes a different and independent error history buffer 420 for each SAS link in a path accessed by the SAS initiator 400. In most SAS systems, each target device 132 has two separate paths to initiators as illustrated in FIG. 3. In such cases, there will be twice as many error history buffers 420 as target devices 132. Therefore, in a system with 24 target devices 132, there would be 48 separate error history buffers 420. Because the number of error history buffers 420 increases as more target devices 132 are added, it is desirable to minimize the memory requirements for each error history buffer 420. In one embodiment, each error history buffer 420 holds a predetermined number of time stamps. In another embodiment, each error history buffer 420 also stores the type of error 444 associated with each time stamp. In other embodiments, there is a separate error history buffer 420 for each type of error 444 for each path. In these latter embodiments, there may be a different error threshold for each type of error, and downshifts are generated by the error evaluator 412 according to the number of received errors of the type corresponding to the error history buffer 420. Variations in error history buffers 420 are shown in more detail in FIG. 5a. In one embodiment, each error history buffer 420 can store up to five time stamps. In a preferred embodiment, each error history buffer 420 is a circular queue, where once the error history buffer 420 is full, the next time stamp will automatically be placed into the first location of the error history buffer 420, thereby overwriting any time stamp previously in the first location. In an alternate embodiment, the error history buffer 420 is a linear queue of time stamps where no time stamp overwriting automatically occurs. Error history buffers 420 are stored in volatile memory 212 within storage controller memory 208.

Each time the error evaluator 412 receives a protocol error, a drive detected error, or a storage device timeout 444, the error evaluator 412 notifies an error handler 416 and checks the error history buffer 420 according to the process of FIGS. 8-12. Based on the error evaluation, if a downshift is required, the error evaluator 412 generates a downshift command 428 to a SCSI enclosure services (SES) event manager 432. In one embodiment, the error evaluator 412 generates a downshift command 428 corresponding to the SAS link the error was reported on, to the SES event manager 432. In a preferred embodiment, if the error evaluator 412 receives five errors in any thirty minute timeframe (measured from the current time compared to the time stamp at the current pointer 424 location), the error evaluator 412 generates the downshift command 428 to the SES event manager 432. In other embodiments, the error evaluator 412 generates the downshift command 428 if the error evaluator 412 receives fewer or more than five errors in any predetermined period of time.

The error handler 416 keeps track of how many retries have been attempted, whether a retry can be attempted on an alternate path (such as the second path on a target device 132), and whether or not a reset needs to be issued to a target device 132. The error handler 416 takes one of two actions, depending on the type of error received from the error evaluator 412. Either a retry 448 or an I/O is placed on a wait queue 452 will be generated by the error handler 416 to higher software layers to take action.

If a downshift is required, the error handler 416 first generates an I/O on wait queue notification 452 to higher software layers. This causes the higher layers to temporarily store the I/O request that produced the error resulting in the downshift, until the downshift has been completed. Thereafter, the error handler 416 generates retry 448 to the higher software layers to cause the I/O request to be retried at the lower transmission speed, following the downshift.

If an upshift is required, the error handler 416 first generates an I/O on wait queue notification 452 to higher software layers. This causes the higher layers to temporarily store the next I/O request until the upshift has been completed. Thereafter, the error handler 416 generates a retry 448 to the higher software layers to cause the I/O request to be transmitted at the higher transmission speed.

The SES event manager 432, after receiving a downshift/upshift command 428, generates a PHY Control Page 436 and sends it to the expander 140 including the PHY where transmission speed will be changed. Each PHY control page 436 is a data structure that identifies various parameters for each PHY 312 within a storage enclosure 128, 148, for example, the native path PHY 312 and the alternate path PHY 312 for target device 132c in storage enclosure 128b of FIG. 1c. The PHY 312 speed is reduced if the error evaluator 412 issued a downshift command 428 to the SES event manager 432 for that PHY 312, and there was an available lower transmission speed available. If the PHY 312 was already operating at the lowest speed (1.5 Gb/s, for example), a lower transmission speed would not be available.

SES event manager 432 regularly polls PHY 312 status from the expander 140 and receives back polled PHY 312 status 440, in order to determine if any links are experiencing errors. Normally, the SES event manager 432 polls PHY status 440 every few seconds (five seconds, in one embodiment) to identify system changes including power supply failures and over temperature conditions. Expander 140 reports transmission speed changes to the SES event manager 432 if any PHYs 312 are either upshifted or downshifted. Transmission speed change is an informational event provided as part of polled PHY status 440, which the SES event manager 432 then provides as update SAS map 468 to the error evaluator 412. SAS map updates 468 are normally stored in volatile memory 212 within storage controller memory 208. SAS map updates 468 may include other changes, such as a target device 132 added or removed.

In response to receiving polled PHY status 440 from expander 140, the SES event manager 432 posts an event 460 to the management controller 224. Management controller 224 then responsively notifies a user or administrator 464 of the change in transmission speed for the identified PHY 312, expander 140, and storage enclosure 128, 148.

In one embodiment, the electronic data storage system 100, 104, 108, 112 initially attempts to operate each PHY 312 at the highest possible transmission speed, and downshifts individual PHYs 312 as receive errors are reported by target devices 132. In a second embodiment, the electronic data storage system 100, 104, 108, 112 initially attempts to operate each PHY 312 at the lowest possible transmission speed, and upshifts individual PHYs 312 as receive errors are not reported by target devices 132 over predetermined periods of time. In a third embodiment, the initial transmission speed for each link is empirically determined and configured accordingly, and the transmission speed for each individual PHY 312 is adjusted upward or downward during runtime based on downshift and upshift evaluations as disclosed herein.

Referring now to FIG. 5a, block diagram illustrating various error history buffer 420 configurations of the present invention is shown. All of the error history buffer 420 configurations shown in FIG. 5a reflect a circular queue configuration, where the first (top most) entry in each buffer is automatically selected after the last (bottom most) entry in each buffer 420 is incremented. The circular queue embodiments are illustrated in the flowcharts of FIGS. 8 and 11. However, it should be understood that each of the illustrated buffer configurations 420 could alternatively be mechanized as a linear queue, where first (top most) entry in each buffer is not automatically selected after the last (bottom most) entry in each buffer 420 is incremented. The linear queue embodiments are illustrated in the flowcharts of FIGS. 9 and 12.

A first error history buffer 420 configuration is circular queue 500, where all error history buffers 420 store only time stamps, and all error history buffers 420 contain the same number of entries. In one embodiment, each circular queue 500 contains five entries. However, it should be understood that all circular queues 500 may contain fewer or more than five entries.

A second error history buffer 420 configuration is circular queue 504, where all error history buffers 420 store time stamps and error type, and all error history buffers 420 contain the same number of entries. In one embodiment, each circular queue 504 contains five entries. However, it should be understood that all circular queues 504 may contain fewer or more than five entries. The error type allows a single queue 504 to store multiple types of errors, so that different decisions may be based upon the number of errors over time that a particular error type occurs. For example, in one embodiment, the error types stored in circular queue 504 include protocol errors, drive detected errors, and device timeouts. When a particular error type is recorded in circular queue 504, in one embodiment the process checks for the time stamp of the immediately previous error type (if any) in the circular queue 504. In another embodiment, the process checks for time difference between the current time and the time stamp for the oldest instantiation of the particular error type (if any). If the time difference is greater than a predetermined value corresponding to the particular error type, then a downshift evaluation is conducted. In one embodiment, the same predetermined value is used for all error types. In a second embodiment, different predetermined values are used for all error types. In a third embodiment, a first predetermined value is used for one or more error types, and a second predetermined value is used for a different one or more error types.

A third error history buffer 420 configuration is circular queues 508, where all error history buffers 420 store time stamps, and all circular queues 508 contain the same number of entries. There is a different circular queue 508 for each error type. Circular error queues 508 operate similar to circular error queues 504, except parsing of error types is not required since each error type has its own queue. Circular error queues 508 has a speed advantage over circular error queues 504 due to no parsing of error types, but requires more memory resources.

A fourth error history buffer 420 configuration is circular queues 512, where all error history buffers 420 store time stamps. There is a different circular queue 512 for each error type, and each of circular queues 512 may contain a different number of entries. For example, each of the circular queues 512 corresponding to error type 1 have three entries, each of the circular queues 512 corresponding to error type 2 have seven entries, and each of the circular queues 512 corresponding to error type 3 have five entries. Circular error queues 512 operate similar to circular error queues 508, except of the different queue size for each error type. Circular error queues 512 may require fewer memory resources than circular error queues 508 and be more optimal for differing expected error frequency between each of the supported error types.

A fifth error history buffer 420 configuration (not shown) is similar to circular queues 512. However, instead of fixed queue size for each error type, a user such as a system administrator can specify the queue size for each error type. Such a configuration allows more control to account for different environmental conditions at an actual site. The different environmental conditions could allow for variance in temperature, humidity, electromagnetic interference, shock, vibration, or other environmental factors.

Referring now to FIG. 5b, a block diagram illustrating an exemplary error management scenario employed for tracking path errors in accordance with embodiments of the present invention is shown. Eight separate error history buffers 420 are shown, for eight different paths between an initiator (or initiators) and target devices. This could represent, for example, paths to eight different target devices 132, or paths to four different target devices 132 with two paths per target device 132. The error history buffers 420 are designated error history buffer 520 for path 0 through error history buffer 548 for path 7. Although an actual system would generally have more than eight paths (and therefore more than eight error history buffers 420), eight buffers are convenient for the purpose of an example. Each of error history buffers 520-548 is implemented as a circular queue 500, and has five entries. The designation "error #" in various queue entries simply designates a different instantiation of the same error type, and not a different error type.

Error history buffer 520 is depicted to have two errors, with current pointer for path 0 error history buffer 552 pointing to the third slot, designating the next queue location following the last entry. Only two entries are in the queue 520, with the remaining three queue slots empty and available to record time stamps.

Error history buffer 524 is depicted to have five errors, with current pointer 556 for path 1 error history buffer 524 pointing to the first slot, designating the next queue location following the last entry. The queue is full, containing five entries, and because the queue is a circular queue, the current pointer 556 has wrapped around to the first slot. Therefore, the next error received for path 1 will overwrite the current entry in the top slot, and will be recorded as path 1, error 5.

Error history buffers 528, 540, and 544 are empty—no errors have been received for path 2, path 5, or path 6.

Error history buffer 532 is depicted to have received six errors, with current pointer 564 for path 3 error history buffer 532 pointing to the second slot, designating the next queue location following the first entry. The queue is full, containing five entries, and because the queue is a circular queue, the time stamp has overwritten the entry in slot 1.

Error history buffer 536 is depicted to have three errors, with current pointer 568 for path 4 error history buffer 536 pointing to the fourth slot, designating the next queue location following the second entry. Only three entries are in the queue 536, with the remaining two queue slots empty.

Error history buffer 548 is depicted to have received fourteen errors, with current pointer 580 for path 7 error history buffer 548 pointing to the last slot, designating the next queue location following the fourth entry. The queue is full, containing five entries, and is on the third pass of overwriting the time stamps. Compared to the other seven paths 0-6, path 7 is experiencing a much higher total number of errors.

Figure 6:
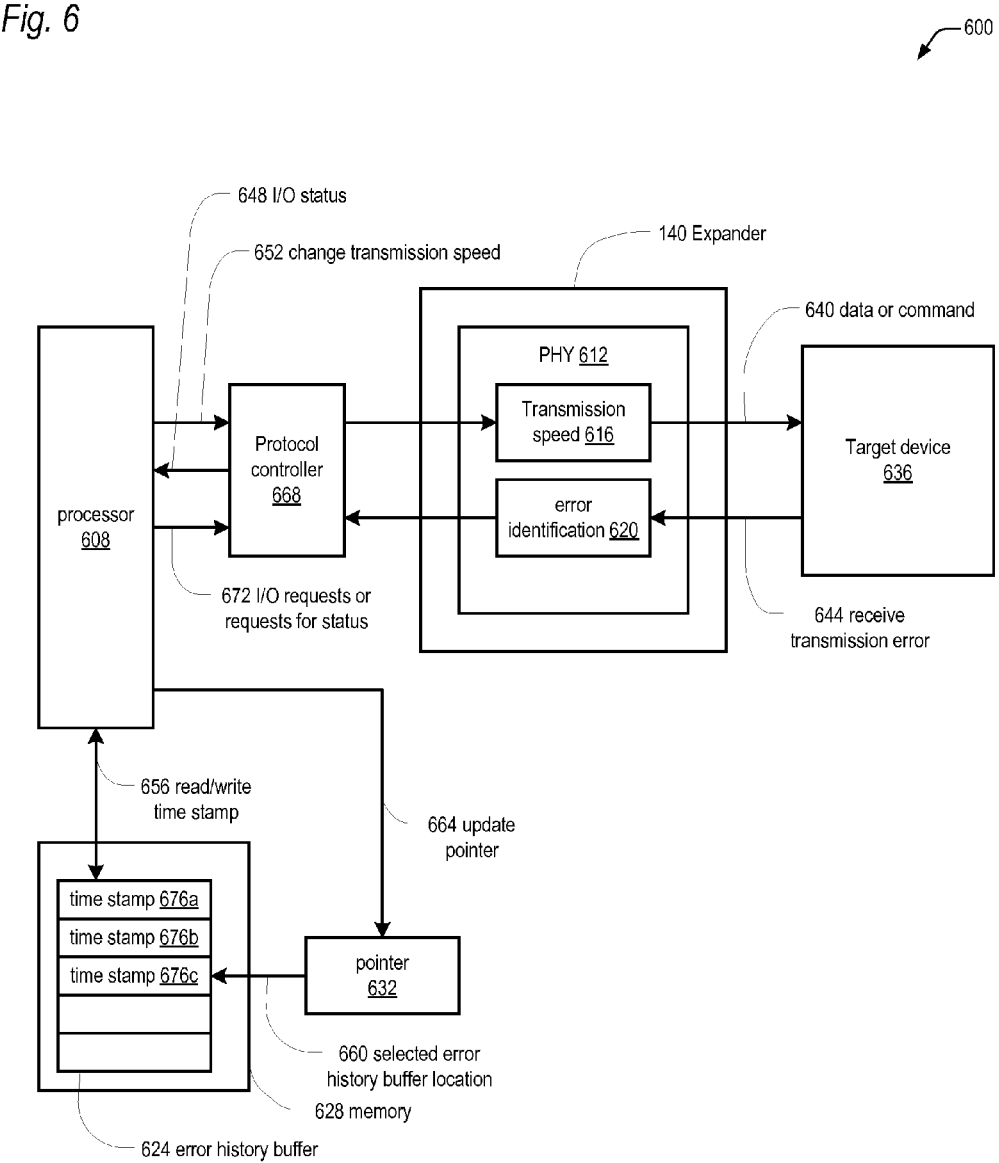
FIG. 6 is a block diagram illustrating exemplary hardware components in accordance with embodiments of the present invention.

Referring now to FIG. 6, a block diagram 600 illustrating exemplary hardware components in accordance with embodiments of the present invention are shown.

Processor 608 that executes various programs to transfer data to and from a target device 636. Processor 608 is any device that executes stored programs, including a CISC or RISC processor, microcontroller, or other device. Examples of processor 608 include, but are not limited to, X86-compatible processors and PowerPC processors. Processor 608 transfers I/O requests or requests for status 672 to a protocol controller 668 that converts I/O requests or requests for status 672 to data or command 640.

The protocol controller 668 is a semiconductor device that converts logical commands from the processor 608 into physical commands that a target device 636 is able to process. In one embodiment, the protocol controller 668 is an LSI Logic 2008 PCI Express SAS protocol controller. Protocol controller 668 transmits data or command 640 to target device 636. The term "command initiator" or "transmitter" refers jointly to the processor 608 and the protocol controller 668, which initiate commands to target devices 636. The term "receiver" is used herein to denote a target device 132, 636.

For simplicity, a midplane 336 or storage enclosure 128, 148 is not shown between the initiating controller 604 and the target device 636, although a midplane 336 or storage enclosure 128, 148 may possibly be present. The target device 636 represents a target device 132.

PHY 612 is a physical interface component, which generates standard analog signaling to the target device 636, and receives error information from the target device 636. PHY 612 is typically, but not necessarily, contained within an expander 140 component, which provides switching functionality between one or more protocol controllers 668, and one or more target devices 636. For simplicity, multiple protocol controllers 668, and multiple target devices 636 are not illustrated in FIG. 6. Among the various functions provided in the PHY 612 is designating the transmission speed 616 between the PHY 612 and the target device 636.

Only one PHY 612 and expander 140 are shown in FIG. 6, although several PHYs and expanders may be in the communication path between protocol controller 668 and target device 636. However, the expander 140 and PHY 612 shown in FIG. 6 always represents the expander 140 and PHY 612 directly connected to the target device 636, since regardless of how many expanders/PHYs are in the communication path, only the PHY directly connected to the target device 636 is upshifted or downshifted.

Protocol controller 668 communicates with target device 636 by transmitting data or command 640 to the target device 636. Data or command 640 is transmitted to the target device 636 at the speed designated by transmission speed 616 in PHY 612. If the target device 636 detects an error in data or command 640, it transmits a receive transmission error 644 to the PHY 612. The PHY 612 provides error identification 620 for the error to protocol controller 668. The protocol controller 668 generates I/O status 648 to the processor 608. Protocol controller 668 may also detect a protocol error or device timeout during communication with target device 636. Either of these will also generate I/O status 648 to the processor 608.

After receiving I/O status 648 from the protocol controller 668, the processor 608 performs a downshift evaluation. Downshift evaluation is initiated by the processor 608 reading 656 the current time stamp 676c in an error history buffer 624 corresponding to the PHY 612 and target device 636 the receive transmission error 644 corresponds to. The current time stamp 676c is identified by a pointer 632 corresponding to the selected error history buffer 624, which generates a selected error history buffer location 660 to the error history buffer 624. The processor 608 then compares the current time to the time stamp 676c read from the error history buffer 624. If the difference between the current time and the time stamp 676c read from the error history buffer 624 is greater than a predetermined value, then transmission speed downshift is not required. The processor 608 then updates the pointer 664, which causes the current time to be written into the error history buffer 624 as a time stamp at the location designated by selected error history buffer location 660. After this, the pointer 632 is incremented to point to the next (fourth) slot in the error history buffer 624. If the difference between the current time and the time stamp 676c read from the error history buffer 624 is less than or equal to than the predetermined value, then transmission speed downshift is required. In that case, the processor 608 generates change transmission speed 652 to the protocol controller 668, to request a downshift of transmission speed, if a lower speed is available. The protocol controller 668 then responsively updates transmission speed 616 in PHY 612. This will cause the next data or command 640 transmitted by the PHY 612 to the target device 636 to be transmitted at the next lower transmission speed 616. In many cases, this will result in improved signal quality at the receiver of the target device 636 and no more receive transmission errors 644 generated by the target device 636 to the PHY 612.

In the case of an upshift evaluation shown in FIGS. 10-12, if the processor 608 determines that an upshift in transmission speed is required, processor 608 generates change transmission speed 652 to the Protocol controller 668, if a higher transmission speed is available. This time, change transmission speed 652 designates a speed upshift instead of a downshift. Protocol controller 668 updates transmission speed 616 in PHY 612 to the next higher available transmission speed. The next time data or command 640 is transmitted from the protocol controller 668 to the target device 636, the data or command 640 transfer will be performed at a higher transmission speed 616.

Figure 7:
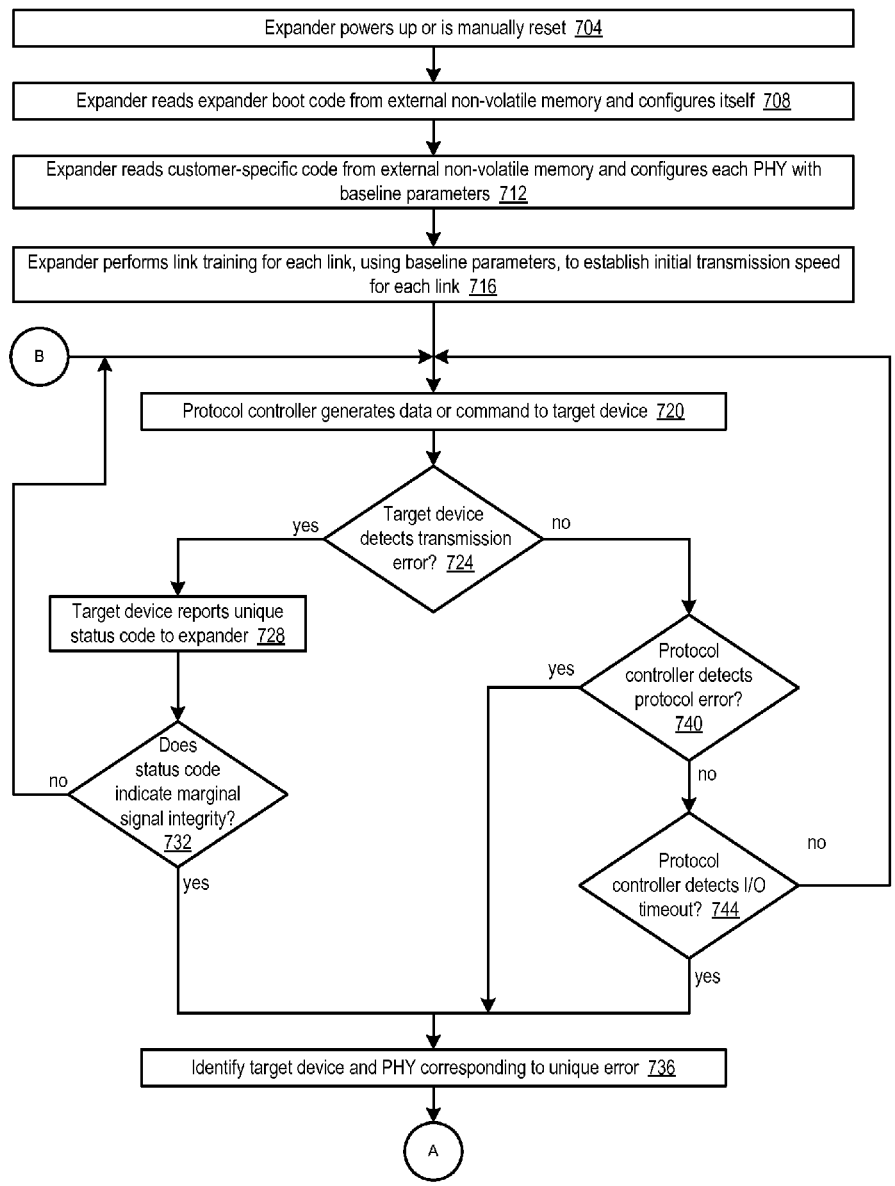
FIG. 7 is a flowchart illustrating steps of data transfer and error detection mechanics between an expander and a target device in accordance with embodiments of the present invention.

Referring now to FIG. 7, a flowchart illustrating steps of data transfer and error detection mechanics between an expander 140 and a target device 636 in accordance with embodiments of the present invention are shown. Flow begins at block 704.

At block 704, the expander 140 powers up, or is manually reset. Power up includes the first time the system is powered-on, or any subsequent restoration of main power following a main power loss. A manual reset is generally initiated by a system administrator, and causes a reboot of stored programs and initialization of the initiating controller. Flow proceeds to block 708.

At block 708, the expander 140 reads expander boot code 328 from an external non-volatile memory 324 and configures itself. This is illustrated in FIG. 3. The expander boot code 328 configures non-system specific parameters of the expander 140, and performs simple diagnostics on the expander 140. Flow proceeds to block 712.

At block 712, after the expander 140 configures itself using expander boot code 328, the expander 140 reads customer-specific code 332 from external non-volatile memory 324, and configures each PHY 312, 612 with baseline parameters. Baseline parameters include analog PHY 312, 612 settings such as slew rate, voltage levels, and baseline transmission speed. In one embodiment, the baseline transmission speed is the lowest transmission speed supported by the PHY 312, 612 and expander 140. In another embodiment, baseline transmission speed is the highest transmission speed supported by the PHY 312, 612 and the expander 140. The process steps of blocks 712-716 are performed by customer-specific boot code 332 in FIG. 3. Flow proceeds to block 716.

At block 716, the expander 140 performs link training for each link, using baseline parameters, in order to establish the initial transmission speed for each link. Link training is described in the SAS specifications, and is outside the scope of the present invention. Flow proceeds to block 720.

At block 720, the protocol controller 668 generates data or a command 640 to the target device 636. Flow proceeds to decision block 724.

At decision block 724, the target device 636 receives the data or command 640 transmitted from the protocol controller 668 to the target device 636 in block 720, and determines whether a transmission error 644 occurred in the path that the data or command 640 was transmitted over. If a transmission error 644 was not detected, flow proceeds to decision block 740. If a transmission error 644 was generated by the target device 636, then flow proceeds to block 728.

At block 728, the target device 636 reports a unique status code to the expander 140. The unique status code corresponds to a specific type of error identified by the target device 636. Flow proceeds to decision block 732.

At decision block 732, the processor 608 determines if the unique status code received from the target device 636 (through the expander/PHY 612 and protocol controller 668) indicates marginal signal integrity. If the unique status code does indicate marginal signal integrity, then flow proceeds to block 736. If the unique status code does not indicate marginal signal integrity, then flow proceeds back to block 720, where the protocol controller 668 generates the next data or command to target device 636. It should be noted that other actions may be taken by the processor 608 if the unique status code does not indicate marginal signal integrity, but such actions are outside of the scope of the present invention. The process steps of blocks 732-744 are performed by CPU 204, 608.

At block 736, the CPU 204, 608 identifies the target device 636 and PHY 612 corresponding to the unique error, where the unique error is a protocol error, a transmission error reported by the target device 636, or a target device 636 timeout. Flow proceeds to either FIG. 8 or 9 to perform downshift evaluation for different embodiments.

At decision block 740, the protocol controller 668 checks if a protocol error is detected. If a protocol error was not detected, then flow proceeds to decision block 744. If a protocol error was detected, then flow proceeds to block 736, where the target device and PHY are identified for the protocol error.

At decision block 744, the protocol controller 668 detects an I/O timeout for target device 636. The I/O timeout indicates target device 636 has not responded to data or command 640 within a specified time period. I/O timeouts may represent a failure of target device 636, the transmit path between PHY 612 and target device 636, or the receive path between PHY 612 and target device 636. If an I/O timeout was not detected, then flow proceeds to block 720 to await the next data or command 640. If an I/O timeout was detected, then flow proceeds to block 736.

Referring now to FIG. 8, a flowchart illustrating steps of downshift evaluation in accordance with a first embodiment of the present invention is shown. The first embodiment of downshift evaluation is the preferred embodiment and utilizes a circular queue for the error history buffer 624, as previously described with respect to queue 500 of FIGS. 5a and 5b. Flow begins at block 804.

At block 804, the processor 608 reads the entry in the error history buffer 624 corresponding to the current pointer 632 for the target device 636 and PHY 612 identified by the unique error. In one embodiment, the entry is a time stamp 676. In another embodiment, the entry is a time stamp 676 and an indication of a specific type of error. Flow proceeds to decision block 808.

At decision block 808, the processor 608 determines if there is a time stamp 676 at the current pointer location 660 in the error history buffer 624. If there is not a time stamp 676 at the current pointer location 660 in the error history buffer 624, then the error history buffer 624 is not yet full and flow proceeds to block 812. If there is a time stamp 676 at the current pointer location 660 in the error history buffer 624, then the error history buffer 624 is full and flow proceeds to block 832.

At block 812, the processor 608 processes the I/O normally, depending on the system design. In one embodiment, the processor 608 retries the data or command 640 one time, and fails the target device 636 if the retry fails. In a second embodiment, the processor 608 retries the data or command 640 a predetermined number of times, and fails the target device 636 if none of the retries succeeds. In RAID environments, the processor 608 may take a failed target device 636 offline and rebuild data to a spare target device 636. Flow proceeds to block 816.

At block 816, the processor 608 replaces the time stamp 676 in the error history buffer 624 corresponding to the current pointer 632 for the target device 636 and PHY 612 with the current time. This action places a new time stamp 676 in the error history buffer 624, replacing the oldest time stamp 676. Flow proceeds to decision block 820.

At decision block 820, the processor 608 determines if the current pointer 632 is at the last location in the error history buffer 624. The last location in the error history buffer 624 is the bottom location in FIGS. 4, 5a, 5b, and 6. If the current pointer 632 is not at the last location in the error history buffer 624, then flow proceeds to block 828. If the current pointer 632 is at the last location in the error history buffer 624, then flow proceeds to block 824.

At block 824, the processor 608 advances the current pointer 632 to the first location in the error history buffer 624. The first location in the error history buffer 624 is the topmost location in FIGS. 4, 5a, 5b, and 6. This is the "wraparound" feature of the circular queue, where there are no more error history buffer 624 locations for the current pointer 632 to be incremented to. In that case, the current pointer 632 is modified to point back to the first (top) location 676a in the error history buffer 624, so that the first location 676a will be overwritten by the time stamp corresponding to the next unique error for the selected target device 636 and PHY 612. Flow proceeds to block 720 of FIG. 7, where the protocol controller 668 generates the next data or command 640 to the target device 636.

At block 828, the processor 608 advances the current pointer 632 to the next location in the error history buffer 624. This requires incrementing the current pointer 632 with update pointer 664. Flow proceeds to block 720 of FIG. 7, where the protocol controller 668 generates the next data or command 640 to the target device 636.

At block 832, the processor 608 compares the current time to the time stamp 676 of the entry in the error history buffer 624 corresponding to the current pointer 632 for the target device 636 and PHY 612 identified by the unique error. This time difference establishes the sample time to receive n errors, where n is the number of entries in the error history buffer 624. Flow proceeds to decision block 836.

At decision block 836, the processor 608 determines if the time difference measured in block 832 is less than a first threshold value. The current pointer 632 points to the oldest time stamp 676 in the error history buffer 624, and comparing the current time to the oldest time stamp 676 determines if the number of entries in the error history buffer 624 (number of received errors) have been received within a predetermined time period (first threshold value). If the time difference is not less than the first threshold value, then a transmission speed downshift is not required and flow proceeds to block 812. If the time difference is less than the first threshold value, then a transmission speed downshift is required and flow proceeds to decision block 840.

At decision block 840, the process has determined that a downshift is required, and the processor 608 now determines if lower transmission speeds are available. If the PHY 612 is already operating at the lowest available transmission speed, then no additional lower transmission speeds are available. For example, a PHY 612 may support 3 Gb/s and 6 Gb/s transmission speeds. If the PHY 612 was operating at 6 Gb/s, then a lower transmission speed of 3 Gb/s is available. If the PHY 612 was operating at 3 Gb/s, then no lower transmission speeds are available. If no lower transmission speeds are available then flow normally proceeds to block 860. If no lower transmission speeds are available then flow optionally proceeds to block 844. If lower transmission speeds are available then flow proceeds to block 848.

At optional block 844, the protocol controller 668 initiates a standard retraining process for the link where the error occurred. Retraining consists of a small number of transfers between the protocol controller 668 and target device 636 to determine at a basic level if data can be transferred Retraining is described in the referenced SAS documents. Flow proceeds to block 860.

At block 848, the processor 608 places the data or command 640 just transmitted to target device 636 on a wait queue in memory 212. Flow proceeds to block 852.

At block 852, the processor generates change transmission speed 652 to PHY 612, which reduces transmission speed 616 to the next lower available speed. Flow proceeds to block 856.

At block 856, the processor 608 removes the data or command 640 from the wait queue and retries the data or command 640 to the target device 636. Flow proceeds to block 860.

At block 860, the processor 608 updates logs reflecting the change (or attempted change, if a change was not possible) in transmission speed, and notifies a user or system administrator accordingly. This allows a user to take additional actions that may affect the link, such as replacing an initiator, a cable, or a target device 636. User notification is provided by management controller 224 and as described with respect to FIGS. 2 and 4. Flow proceeds to block 816, where the processor 608 updates the time stamp 676 in the error history buffer 624.

Referring now to FIG. 9, a flowchart illustrating steps of downshift evaluation in accordance with a second embodiment of the present invention is shown. The second embodiment of downshift evaluation utilizes a linear queue for the error history buffer 624, as previously described with respect to FIG. 5a. Flow begins at block 904.

At block 904, the processor 608 writes a time stamp 676 of the current time in the error history buffer 624 corresponding to the current pointer 632 for the target device 636 and PHY 612 corresponding to the unique error. In one embodiment, the entry is a time stamp 676. In another embodiment, the entry is a time stamp 676 and an indication of a specific type of error. Flow proceeds to decision block 908.

At decision block 908, the processor 608 determines if the current pointer 632 for the error history buffer 624 for the target device 636 and PHY 612 corresponding to the unique error is at the last (bottom) location in the linear queue. One the linear queue is full, downshift can be evaluated. If the current pointer 632 is at the last location in the linear queue, then the error history buffer 624 is full, and flow proceeds to block 920. If the current pointer 632 is not at the last location in the linear queue, then the error history buffer 624 is not full, and flow proceeds to block 912.

At block 912, the processor 608 processes the I/O normally, depending on the system design. In one embodiment, the processor 608 retries the data or command 640 one time, and fails the target device 636 if the retry fails. In a second embodiment, the processor 608 retries the data or command 640 a predetermined number of times, and fails the target device 636 if none of the retries succeeds. In RAID environments, the processor 608 may take a failed target device 636 offline and rebuild data to a spare target device 636. Flow proceeds to block 916.

At block 916, the processor 608 advances the current pointer 632 to the next location in the error history buffer 624. The error history buffer 624 is not full, and therefore one or more available locations (i.e. not containing a time stamp 676) remain available for use, and the sampling period continues. Flow proceeds to block 720 of FIG. 7, where the protocol controller 668 generates the next data or command 640 to the target device 636.

At block 920, the current pointer 632 is at the last location in the linear queue, and processor 608 compares the time stamp 676 of the last entry in the error history buffer 624 corresponding to the current pointer 632 for the target device 636 and PHY 612 identified by the unique error, to the first time stamp 676a in the error history buffer 624. This time difference establishes the sample time to receive n errors, where n is the number of entries in the error history buffer 624. Flow proceeds to decision block 924.

At decision block 924, the processor 608 determines if the time difference measured in block 920 is less than a first threshold value. This establishes if the number of entries in the error history buffer 624 (number of received errors) have been received within a predetermined time period (first threshold value). If the time difference is not less than the first threshold value, then a transmission speed downshift is not required and flow proceeds to block 912. If the time difference is less than the first threshold value, then a transmission speed downshift is required and flow proceeds to decision block 936.

At block 928, the processor 608 clears all locations in the error history buffer 624, in preparation for a new sampling period. Flow proceeds to block 932.

At block 932, the processor 608 advances the current pointer 632 to the first (top) location 676a in the error history buffer 624 for the target device 636 and PHY 612 corresponding to the unique error. This action and block 924 prepares the linear queue for the next error sampling period. Flow proceeds to block 720 of FIG. 7, where the protocol controller 668 generates the next data or command 640 to the target device 636.

At decision block 936, the processor 608 determines if lower transmission speeds are available. If the PHY 612 is already operating at the lowest available transmission speed, then no additional lower transmission speeds will be available. For example, a PHY 612 may support 3 Gb/s and 6 Gb/s transmission speeds. If the PHY 612 was operating at 6 Gb/s, then a lower transmission speed of 3 Gb/s is available. If the PHY 612 was operating at 3 Gb/s, then no lower transmission speeds are available. If no lower transmission speeds are available then flow normally proceeds to block 956. If no lower transmission speeds are available then flow optionally proceeds to block 940. If lower transmission speeds are available then flow optionally proceeds to block 944.

At optional block 940, the protocol controller 668 initiates a standard retraining process for the link where the error occurred. Retraining consists of a small number of transfers between the initiator 604 and target device 636 to determine at a basic level if data can be transferred. Retraining is described in the referenced SAS documents. Flow proceeds to block 956.

At block 944, the processor 608 places the data or command 640 just transmitted to target device 636 on a wait queue in memory 212. Flow proceeds to block 948.

At block 948, the processor generates change transmission speed 652 to PHY 612, which reduces transmission speed 616 to the next lower available speed. Flow proceeds to block 952.

At block 952, the processor 608 removes the data or command 640 from the wait queue and retries the data or command 640 to the target device 636. Flow proceeds to block 956.

At block 956, the processor 608 updates logs reflecting the change (or attempted change, if a change was not possible) in transmission speed, and notifies the user accordingly. This allows a user to take additional actions that may affect the link, such as replacing an initiator, a cable, or a target device 636. Flow proceeds to block 928.

Referring now to FIG. 10, a flowchart illustrating steps of triggering events for upshift evaluation in accordance with the present invention is shown. Flow begins at blocks 1004, 1008, 1012, 1016, and 1020.

At block 1004, the initiator 604 experiences either a manual reset condition or a power up. A manual reset is generally performed by a user sometime after power-up, in order to initialize the system and in some cases clear certain error types. Flow proceeds to block 1024.

At block 1008, temperature sensors associated with either the initiator or target device 636 detects meaningful improvement. In one embodiment, meaningful improvement is 10 degrees or more Celsius lower than a previous high temperature limit, where the high temperature limit is the maximum operating temperature of the initiator or target device 636. In another embodiment, meaningful improvement is 10 degrees or more Celsius higher than a previous low temperature limit, where the low temperature limit is the minimum operating temperature of the initiator or target device 636. However, it should be understood that temperature margins are system-specific and may be different than 10 degrees Celsius. Flow proceeds to decision block 1024.

At block 1012, the initiator detects a topology change. A topology change is a change in physical system configuration, such as an added or removed cable, an added or removed initiator (other than initiator 604), or an added or removed target device 636. Flow proceeds to decision block 1024.

At block 1016, a user performs a manual rescan of all target devices 636. This causes the initiator to determine which target device(s) 636 are interconnected to the initiator 604, and the current status of the target devices 636. Flow proceeds to decision block 1024.

At block 1020, a slow timer in the initiator times out. Up shift evaluation should be performed very infrequently during normal operation, so that significant history is established to determine that an up shift can be made without compromising system reliability. Although a downshift may be performed if various errors are reported, including receive transmission errors, protocol errors, or target device 636 timeouts, link performance could be severely degraded if rapid changes between up shift and downshift were performed. Therefore, a slow timer is utilized to check infrequently for the possibility of transmission speed up shift. In one embodiment, the timer period is one day (24 hours). In other embodiments, it could be less than or more than one day. For example, for a performance sensitive link with consistently high I/O rates, it may be advantageous to utilize a timer period of a few hours instead. Flow proceeds to block 1024.

At block 1024, the processor 608 selects an initial PHY for up shift evaluation. Flow proceeds to block 1104 of FIG. 11 or block 1204 of FIG. 12.

Referring now to FIG. 11, a flowchart illustrating steps of upshift evaluation in accordance with a first embodiment of the present invention is shown. The first embodiment is the preferred embodiment and utilizes a circular queue for the error history buffer 624. Flow begins at decision block 1104.

At decision block 1104, the processor 608 determines if there is a time stamp 676 in the error history buffer 624 corresponding to the target device 636 and PHY 612, at the entry just prior to the location 660 designated by the current pointer 632. For a circular queue, if the current pointer 632 points to the first (top) location in the queue, the entry just prior to the current pointer 632 is the last (bottom) location in the queue. If there is no time stamp 676 at the entry just prior to the current pointer 632, then no comparison may be made with the current time in block 1112 and flow proceeds to decision block 1128, where the processor 608 checks if additional PHYs need to be evaluated for up shift potential. If there is a time stamp 676 at the entry just prior to the current pointer 632, then an error has previously been recorded in the error history buffer 624 and a comparison may be made with the current time in block 1112 and flow proceeds to block 1108.

At block 1108, the processor 608 reads the time stamp 676 of the entry in the error history buffer 624 just prior to the current pointer 632, for the target device 636 and PHY 612 corresponding to the unique error. In one embodiment, the entry is a time stamp 676. In another embodiment, the entry is a time stamp 676 and an indication of a specific type of error. Flow proceeds to block 1112.

At block 1112, the processor 608 compares the time stamp 676 of the entry in the error history buffer 624 just prior to the current pointer 632, for the target device 636 and PHY 612 addressed by the command, to the current time. This measures the time difference between the current time and the last error. Flow proceeds to decision block 1116.

At decision block 1116, the processor 608 determines if the time difference between the time stamp 676 of the entry in the error history buffer 624 for the target device 636 and PHY 612 addressed by the command just prior to the current pointer 632, and the current time, is greater than a second threshold value. Although in some cases it may be possible for the first and second threshold values to be equal, in most cases they will be different. The second threshold value generally takes into the account the number of expected I/O requests over time for the selected PHY 612. That is, the second threshold value should be set appropriately high so that a meaningful number of I/O requests will be processed through the PHY 612 in the second threshold time period. The upshift evaluation needs to be reliably performed so that if a transmission speed upshift is required, the upshift will be made expecting no following downshift for a long period of time. It is desirable to minimize the frequency of upshifts/downshifts in order to reduce processing time and receive errors. If the time difference is greater than the second threshold value, then flow proceeds to decision block 1120. If the time difference is not greater than the second threshold value, then flow proceeds to decision block 1128.

At decision block 1120, the processor 608 determines if higher transmission speeds are available. If the PHY 612 is already operating at the highest available transmission speed, then no additional higher transmission speeds will be available. For example, a PHY 612 may support 3 Gb/s and 6 Gb/s transmission speeds. If the PHY 612 was operating at 3 Gb/s, then a higher transmission speed of 6 Gb/s is available. If the PHY 612 was operating at 6 Gb/s, then no higher transmission speeds are available. If no higher transmission speeds are available then flow proceeds to decision block 1128. If higher transmission speeds are available then flow proceeds to block 1124.

At block 1124, the processor generates change transmission speed 652 to PHY 612, which increases transmission speed 616 to the next higher available speed. Flow proceeds to decision block 1128.

At decision block 1128, the processor 608 determines if there are more PHYs to evaluate for up shift potential. If there are more PHYs 312, 612 to evaluate, then flow proceeds to block 1132. If there are not more PHYs 312, 612 to evaluate, then flow proceeds to block 1136.

At block 1132, the processor 608 selects the next PHY 312, 612 to evaluate for up shift potential. Flow proceeds to decision block 1104.

At block 1136, the processor 608 updates logs reflecting the change (or attempted change, if a change was not possible) in transmission speed 616, and notifies the user accordingly. Flow proceeds to block 720 of FIG. 7, where the protocol controller 668 generates the next data or command 640 to the target device 636.

Referring now to FIG. 12, a flowchart illustrating steps of upshift evaluation in accordance with a second embodiment of the present invention is shown. The second embodiment utilizes a linear queue for the error history buffer 624. Flow begins at decision block 1204.

At decision block 1204, the processor 608 determines if the current pointer 632 is at the first (top) entry 676a in the error history buffer 624. For a linear queue, if the current pointer 632 points to the first location in the queue, the linear queue is empty and no comparison may be made with the current time in block 1212. In that case, flow proceeds to block 1228, where the processor 608 determines if there are more PHYs to evaluate for up shift potential. If the current pointer 632 does not point to the first location in the queue, then the queue contains at least one time stamp 676. In that case, flow proceeds to block 1208.

At block 1208, the processor 608 reads the time stamp 676 of the entry in the error history buffer 624 just prior to the current pointer 632, for the target device 636 and PHY 612 corresponding to the unique error. In one embodiment, the entry is a time stamp 676. In another embodiment, the entry is a time stamp 676 and an indication of a specific type of error. Flow proceeds to block 1212.

At block 1212, the processor 608 compares the time stamp 676 of the entry in the error history buffer 624 for the target device 636 and PHY 612 addressed by the entry just prior to the current pointer 632, to the current time. This measures the time difference between the current time and the last error. Flow proceeds to decision block 1216.

At decision block 1216, the processor 608 determines if the time difference between the time stamp 676 of the entry in the error history buffer 624 just prior to the current pointer 632, for the target device 636 and PHY 612 addressed by the entry, and the current time, is greater than a second threshold value. Although in some cases it may be possible for the first and second threshold values to be equal, in most cases they will be different. The second threshold value generally takes into the account the number of expected I/O requests over time for the selected PHY 612. That is, the second threshold value should be set appropriately high so that a meaningful number of I/O requests will be processed through the PHY 612 in the second threshold time period. The upshift evaluation needs to be reliably performed so that if a transmission speed upshift is required, the upshift will be made expecting no following downshift for a long period of time. It is desirable to minimize the frequency of upshifts/downshifts in order to reduce processing time and receive errors. If the time difference is greater than the second threshold value, then flow proceeds to decision block 1220. If the time difference is not greater than the second threshold value, then flow proceeds to decision block 1228.

At decision block 1220, the processor 608 determines if higher transmission speeds are available. If the PHY 612 is already operating at the highest available transmission speed, then no additional higher transmission speeds will be available. For example, a PHY 612 may support 3 Gb/s and 6 Gb/s transmission speeds. If the PHY 612 was operating at 3 Gb/s, then a higher transmission speed of 6 Gb/s is available. If the PHY 612 was operating at 6 Gb/s, then no higher transmission speeds are available. If no higher transmission speeds are available then flow proceeds to decision block 1228. If higher transmission speed(s) are available then flow proceeds to block 1224.

At block 1224, the processor generates change transmission speed 652 to PHY 612, which increases transmission speed 616 to the next higher available speed. Flow proceeds to decision block 1228.

At decision block 1228, the processor 608 determines if there are more PHYs to evaluate for up shift potential. If there are more PHYs 312, 612 to evaluate, then flow proceeds to block 1232. If there are not more PHYs 312, 612 to evaluate, then flow proceeds to block 1236.

At block 1232, the processor 608 selects the next PHY 312, 612 to evaluate for up shift potential. Flow proceeds to decision block 1204.

At block 1236, the processor 608 updates logs reflecting the change (or attempted change, if a change was not possible) in transmission speed 616, and notifies the user accordingly. Flow proceeds to block 720 of FIG. 7, where the protocol controller 668 generates the next data or command 640 to the target device 636.

Referring now to FIG. 13, a table illustrating storage of PHY 612 parameters for a given combination of target device types 1308 and storage enclosure slots 1304 in accordance with embodiments of the present invention is shown. Such a table could be used to initially configure PHY 612 parameters for all PHYs 612 individually, based on the target device type 1308, and where the target device was physically located 1304. In most storage systems containing target devices 636, separate bays, or slots, are used to store each target device. Often, storage devices such as hard disk drives or solid state disks (SSDs) are individually mounted on hot-pluggable sleds that blind mate with a receptacle on a passive midplane 336 or backplane. Each slot 1304 will likely have slightly different electrical performance due to different routing of cables, PCB traces, or connector locations. In addition, component variations including PCB manufacturing variances contribute to different electrical performance based on storage system slot 1304.

One approach to optimizing electrical performance in a system having multiple target devices and multiple potential locations for each target device, without having to perform downshift/upshift evaluation (or in addition to performing downshift/upshift evaluation) is to initially configure PHY 612 parameters for each target device type 1308 based on storage enclosure slot 1304. This will likely produce much more reliable initial configuration, since the PHY 612 parameters will be pre-tested for optimal electrical performance and reliability. For example, target device 4 in storage enclosure slot 5 will cause the corresponding PHY 612 to be programmed with PHY parameters 4,5.

At the initial system power-on, it is usually not known what target device type 1308 is in a specific storage enclosure slot 1304. The processor 608 must query the target device 636 in order to determine the target device type 1308. A mitigating solution is to program each PHY 612 with average PHY parameters 1312 for the corresponding slot 1304. Therefore, the PHY 612 for storage enclosure slot 0 will be initially programmed with slot 0 average PHY parameters 1312. After the processor 608 later queries the target device 636 in slot 0 and determines the target device type 1308, the processor 608 can optionally program the specific PHY parameters for slot 0 into the PHY 612.

The advantage of the programmable PHY 612 parameters of FIG. 13 is better likelihood of initial reliable data transmission between initiators and target devices 636. However, this approach has a few drawbacks. First, the number of testing permutations is potentially large, and increases with the number of storage enclosure slots 1304 and target device types 1308. At some point, the ongoing testing burden may exceed the perceived value. Second, the data structures to hold all of the combinations of PHY parameters and average PHY parameters 1312 grow in a similar fashion to the testing requirements, therefore consuming a larger portion of non-volatile memory 216, 324 resources to store the parameters.

Figure 14:
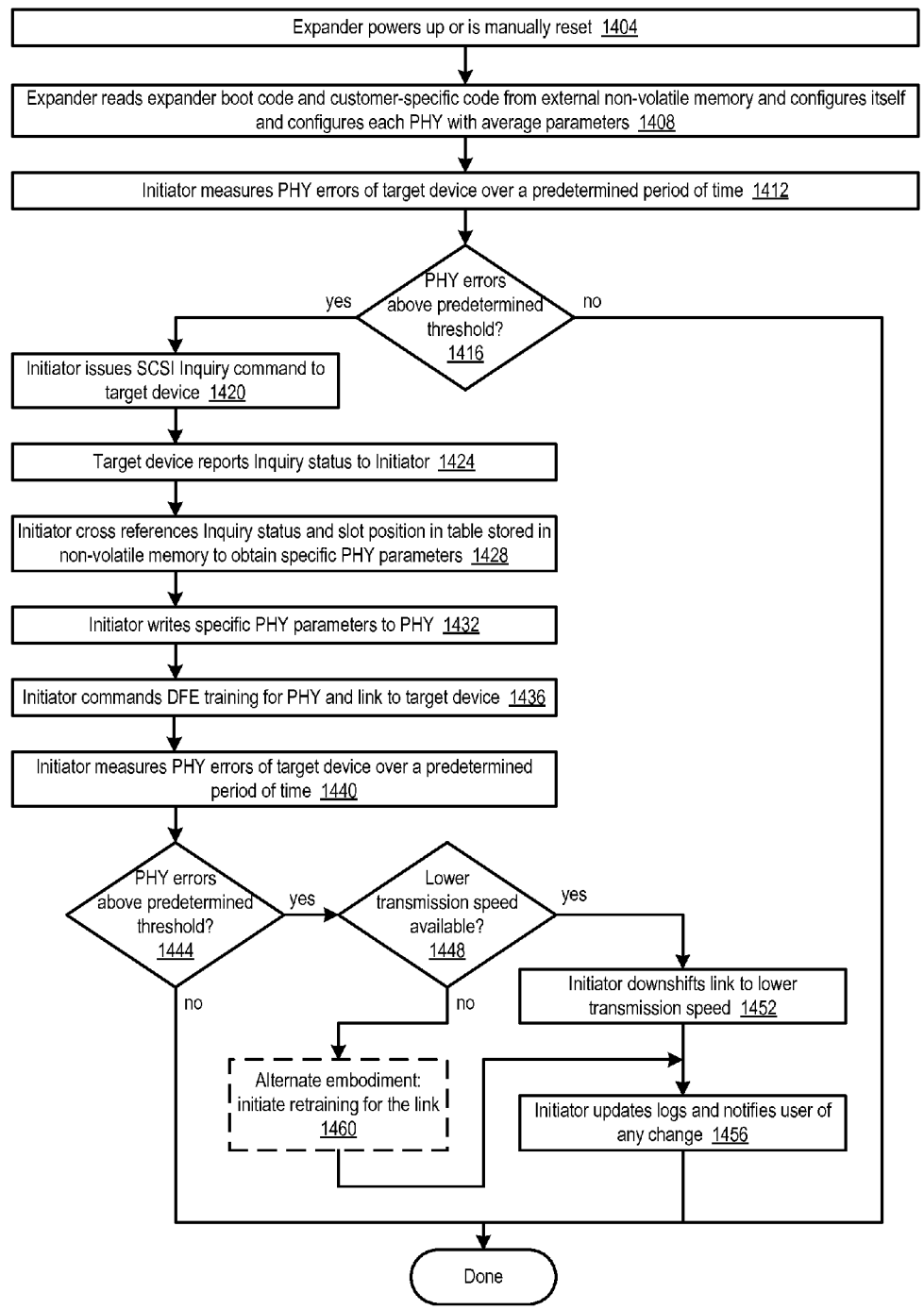
FIG. 14 is a flowchart illustrating steps of downshift evaluation in accordance with an embodiment utilizing the table of FIG. 13 of the present invention.

Referring now to FIG. 14, a flowchart illustrating steps of downshift evaluation in accordance with an embodiment utilizing the table of FIG. 13 of the present invention is shown. Flow begins at block 1404.

At block 1404, the expander 140 powers up, or is manually reset. Power up includes the first time the system is powered-on, or any subsequent restoration of main power following a main power loss. A manual reset is generally initiated by a system administrator, and causes a reboot of stored programs and initialization of the initiating controller. Flow proceeds to block 1408.

At block 1408, the expander 140 reads expander boot code 328 and customer-specific code 332 from an external non-volatile memory 324. The expander 140 then configures itself and configures each PHY 612 with average PHY parameters 1312. The average PHY parameters 1312 are obtained from a table stored in memory 324, by cross referencing the storage enclosure slot 1304. Flow proceeds to block 1412.

At block 1412, the processor 608 measures PHY 612 errors for each target device 636 over a predetermined period of time. In one embodiment, the predetermined period of time is five minutes. However, the predetermined period of time may be more or less than five minutes. Flow proceeds to decision block 1416.

At decision block 1416, the processor 608 determines if the measured number of PHY 612 errors in the predetermined period of time is above a predetermined threshold. If the measured number of PHY 612 errors in the predetermined period of time is not above a predetermined threshold, then the current transmission speed 616 is reliable and the process ends. If the measured number of PHY 612 errors in the predetermined period of time is above a predetermined threshold, then the current transmission speed 616 is not reliable and flow proceeds to block 1420.

At block 1420, the protocol controller 668 issues a SCSI inquiry command to the target device 636 reporting PHY 612 errors above a predetermined threshold. Flow proceeds to block 1424.

At block 1424, the target device 636 reports inquiry status to the processor 608. Inquiry status includes information such as manufacturer, model number, version number, and similar identifying information for target device 636. Flow proceeds to block 1428.

At block 1428, the processor 608 cross references the inquiry status received from the target device 636 with the enclosure slot position 1304 corresponding to the PHY 612 coupled to the target device 636 in order to obtain specific PHY parameters. Flow proceeds to block 1432.

At block 1432, the processor 608 writes the specific PHY parameters to the expander 140 PHY 612. Flow proceeds to block 1436.

At block 1436, after writing the specific PHY parameters to the PHY 612, the processor 608 commands DFE training for the PHY 612 and link to the target device 636. DFE training will establish of the link will operate at a basic level with the specific PHY parameters. Flow proceeds to block 1440.

At block 1440, the processor 608 measures PHY 612 errors for the target device 636 over a predetermined period of time. In one embodiment, the predetermined period of time is five minutes. However, the predetermined period of time may be more or less than five minutes. Flow proceeds to decision block 1444.

At decision block 1444, the processor 608 determines if the measured number of PHY 612 errors in the predetermined period of time is above a predetermined threshold. In one embodiment, the predetermined threshold is five errors in a 30 minute period. If the measured number of PHY 612 errors in the predetermined period of time is not above the predetermined threshold, then the current transmission speed is reliable and flow ends at decision block 1444. If the measured number of PHY 612 errors in the predetermined period of time is above a predetermined threshold, then the current transmission speed is not reliable and flow proceeds to decision block 1448.

At decision block 1448, the processor 608 determines if a lower transmission speed is available. If the PHY 612 is already operating at the lowest available transmission speed, then no additional lower transmission speeds will be available. For example, a PHY 612 may support 3 GB/s and 6 GB/s transmission speeds. If the PHY 612 was operating at 6 GB/s, then a lower transmission speed of 3 GB/s is available. If the PHY 612 was operating at 3 GB/s, then no lower transmission speeds are available. If no lower transmission speeds are available then flow normally proceeds to block 1456. If no lower transmission speeds are available then flow optionally proceeds to block 1460. If lower transmission speeds are available then flow optionally proceeds to block 1452.

At optional block 1460, the protocol controller 668 initiates a standard retraining process for the link where the error occurred. Retraining consists of a small number of transfers between the processor 608 and target device 636 to determine at a basic level if data can be transferred. Retraining is described in the referenced SAS documents. Flow proceeds to block 1456.

At block 1452, lower transmission speeds (at least one) are available, and the processor 608 reduces the transmission speed 616 of the PHY 612 to the next lower transmission speed 616 for the PHY 612 corresponding to the target device 636. Flow proceeds to block 1456.

At block 1456, the processor 608 updates logs reflecting the change (or attempted change, if a change was not possible) in transmission speed 616, and notifies the user accordingly. This allows a user to take additional actions that may affect the link, such as replacing an initiator, a cable, or a target device 636. Flow ends at 1456.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A method for maintaining reliable communication between a command initiator and a target device, comprising:
   detecting, by the command initiator, an error corresponding to the target device;
   determining, by the command initiator, that the error corresponds to one of a protocol error, a drive detected error, and a target device timeout;
   performing, by the command initiator, a downshift evaluation for a path between the command initiator and the target device, the downshift evaluation comprising:
      identifying the target device and the path between the target device and the command initiator;
      determining if a time stamp is at a location in a memory, wherein the location in the memory is designated by a pointer, wherein the memory corresponds to the path and the target device;
      in response to determining that a time stamp is at the location in the memory, reading the time stamp from the location in the memory;
      comparing the time stamp to the current time in order to determine if the difference is less than a predetermined value;
         if the difference between the time stamp and the current time is not less than the predetermined value, forgoing transmission speed downshift, and
         if the difference between the time stamp and the current time is less than the predetermined value, requiring transmission speed downshift;
   in response to performing the downshift evaluation for the path,
      maintaining a transmission speed of the path if the downshift evaluation determines that forgoing transmission speed downshift is required for the path; and
      reducing the transmission speed of the path if the downshift evaluation determines that transmission speed downshift is required for the path;
   logging the downshift evaluation result; and
   reporting any transmission speed change for the path to a user.

2. The method of claim 1, wherein after reading the location in the memory no time stamp is found, foregoing determining if the difference between the time stamp and the current time is less than a predetermined value and instead writing the current time into the location in the memory and changing the pointer to identify a next location in the memory.

3. The method of claim 1, wherein the memory stores a plurality of time stamps, wherein each of the plurality of time stamps indicates the historical time that the command initiator detected an error corresponding to the target device.

4. The method of claim 1, wherein requiring transmission speed downshift comprises reducing the transmission speed of the path to a next lower transmission speed, if a lower transmission speed is available.

5. The method of claim 4, wherein the command initiator initiates path retraining if a lower transmission speed is not available.

6. The method of claim 1, wherein forgoing transmission speed downshift comprises replacing the time stamp in the location in the memory with the current time.

7. The method of claim 6, wherein in response to replacing the time stamp in the location in the memory with the current time, determining if the location in the memory is a last location in the memory;
   if the location in the memory is the last location in the memory, changing the pointer to identify a first location in the memory, and
   if the location in the memory is not the last location in the memory, changing the pointer to identify a next sequential location in the memory.

8. A system for maintaining reliable communication between a command initiator and a target device, comprising:
   a command initiator comprising:
      a memory;
   a target device; and
   a path, coupled to the command initiator and the target device, wherein the path provides communication between the command initiator and the target device,
   wherein the command initiator identifies the target device and the path between the target device and the command initiator, wherein after the command initiator identifies the target device and the path, the command initiator reads a time stamp from a location in the memory, wherein the memory corresponds to the path and the target device, wherein a pointer identifies the location of the time stamp, wherein the command initiator detects an error corresponding to the target device, wherein the command initiator determines that the error corresponds to one of a protocol error, a drive detected error, and a target device timeout, wherein the command initiator performs a downshift evaluation for the path, and in response to performing the downshift evaluation, the command initiator maintains the transmission speed of the path if the downshift evaluation determines that forgoing a transmission speed downshift is required for the path and the command initiator reduces the transmission speed of the path if the downshift evaluation determines that a transmission speed downshift is required for the path, wherein the command initiator logs the downshift evaluation result and reports any transmission speed change to a user.

9. The system of claim 8, wherein the memory stores a plurality of time stamps, wherein each of the plurality of time stamps indicates the historical time that the command initiator detected an error corresponding to the target device.

10. The system of claim 8, wherein after the command initiator reads the time stamp from the location in the memory, the command initiator determines if the difference between the time stamp and current time is less than a predetermined value, wherein in response to the command initiator determining if the difference between the time stamp and the current time is less than the predetermined value, the command initiator forgoes transmission speed downshift if the difference between the time stamp and the current time is not less than the predetermined value and the command initiator requires transmission speed downshift if the difference between the time stamp and the current time is less than the predetermined value.

11. The method of claim 10, wherein after the command initiator reads the location in the memory no time stamp is found, the command initiator foregoes determining if the difference between the time stamp and the current time is less than the predetermined value and instead writes the current time into the location in the memory and changes the pointer to identify a next sequential location in the memory.

12. The system of claim 10, wherein transmission speed downshift comprises the command initiator reduces the transmission speed of the path to a next lower transmission speed, if a lower transmission speed is available.

13. The system of claim 12, wherein the command initiator initiates path retraining if a lower transmission speed is not available.

14. The system of claim 10, wherein the command initiator forgoes transmission speed downshift comprises the command initiator replaces the time stamp in the location in the memory with the current time.

15. The system of claim 14, wherein in response to the command initiator replaces the time stamp in the location in the memory with the current time, the command initiator determines if the location in the memory is a last location in the memory;
- if the location in the memory is the last location in the memory, the command initiator changes the pointer to identify a first location in the memory, and
- if the location in the memory is not the last location in the memory, the command initiator increments the pointer to identify a next sequential location in the memory.

16. A method for providing reliable point-to-point communications between an adjustable transmitter PHY and a non-adjustable receiver PHY, comprising:
- transmitting first data from the transmitter to the receiver, wherein a path couples the transmitter to the receiver;
- detecting an error corresponding to the path and the receiver, by the transmitter, after transmitting the first data from the transmitter to the receiver;
- in response to the transmitter detecting the error corresponding to the path and the receiver, performing, by the transmitter, a downshift evaluation;
- determining if the downshift evaluation requires a downshift, and in response:
    - maintaining a path transmission speed if the downshift evaluation does not require a reduction in transmission speed; and
    - reducing the path transmission speed to a next lower path transmission speed if the downshift evaluation requires a reduction in transmission speed, if a lower path transmission speed is available;
- logging the downshift evaluation result;
- reporting any transmission speed change to a user;
- waiting for a timer to expire;
- in response to the timer expiring, performing, by the transmitter, an upshift evaluation for the path between the transmitter and the receiver;
- determining if the upshift evaluation requires an increase in transmission speed, and in response:
    - maintaining path transmission speed if the upshift evaluation does not require an increase in transmission speed; and
    - increasing the path transmission speed to a next higher path transmission speed if the upshift evaluation requires an increase in transmission speed, if a higher path transmission speed is available;
- logging the upshift evaluation result; and
- reporting any transmission speed change to a user.

17. The method of claim 16, wherein downshift evaluation comprises:
- identifying the receiver and the path between the transmitter and the receiver;
- reading a time stamp from a location in a memory of the transmitter, wherein the memory corresponds to the path and the receiver;
- determining if the difference between the time stamp and current time is less than a first predetermined value;
    - if the difference between the time stamp and the current time is not less than the first predetermined value, forgoing transmission speed reduction, and
    - if the difference between the time stamp and the current time is less than the first predetermined value, requiring transmission speed reduction.

18. The method of claim 16, wherein upshift evaluation comprises:
- identifying the receiver and the path between the transmitter and the receiver;
- reading a time stamp from a location in a memory of the transmitter, wherein the memory corresponds to the path and the receiver;
- determining if the difference between the time stamp and current time is greater than a second predetermined value;
    - if the difference between the time stamp and the current time is not greater than the second predetermined value, forgoing transmission speed increase, and
    - if the difference between the time stamp and the current time is greater than the second predetermined value, requiring transmission speed increase.

* * * * *